US012646265B2

(12) United States Patent
Kim et al.

(10) Patent No.: US 12,646,265 B2
(45) Date of Patent: Jun. 2, 2026

(54) WEARABLE ELECTRONIC DEVICE DISPLAYING VIRTUAL OBJECT AND METHOD FOR CONTROLLING THE SAME

(71) Applicant: SAMSUNG ELECTRONICS CO., LTD., Suwon-si (KR)

(72) Inventors: Kyunghwa Kim, Suwon-si (KR); Sanga Yoo, Suwon-si (KR); Sunho Kim, Suwon-si (KR); Minseoung Woo, Suwon-si (KR); Hyunjun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 18/209,912

(22) Filed: Jun. 14, 2023

(65) Prior Publication Data

US 2024/0046578 A1      Feb. 8, 2024

Related U.S. Application Data

(63) Continuation of application No. PCT/KR2023/006711, filed on May 17, 2023.

(30) Foreign Application Priority Data

Aug. 4, 2022    (KR) ........................ 10-2022-0097242
Nov. 11, 2022    (KR) ........................ 10-2022-0150955

(51) Int. Cl.
*G06T 3/40*          (2024.01)
*G06T 19/00*          (2011.01)

(52) U.S. Cl.
CPC .............. *G06T 19/006* (2013.01); *G06T 3/40* (2013.01)

(58) Field of Classification Search
CPC ................................ G06T 19/006; G06T 3/40
(Continued)

(56) References Cited

U.S. PATENT DOCUMENTS 8,687,094 B2    4/2014  Lee et al.
9,940,003 B2    4/2018  Han et al.
(Continued)

FOREIGN PATENT DOCUMENTS

JP        2014-191718 A        10/2014
JP        2021-530021 A        11/2021
(Continued)

OTHER PUBLICATIONS

International Search Report issued on Jul. 26, 2023 by International Searching Authority in International Application No. PCT/KR2023/006711.

(Continued)

*Primary Examiner* — Hai Tao Sun
(74) *Attorney, Agent, or Firm* — Sughrue Mion, PLLC

(57)          ABSTRACT

A wearable electronic device includes: a display, a camera, and at least one processor operatively connected with the display and the camera. The at least one processor is configured to, control to display an image obtained by the camera on the display, control to display a first virtual object in a partial area of the displayed image, control to replace the displayed first virtual object with an enlarged second virtual object based on receiving a user input to enlarge the first virtual object through the camera, map a first portion of the second virtual object to an area corresponding to the displayed image, map a remaining portion of the second virtual object that does not include the first portion to a surrounding area of the area corresponding to the displayed image, and control to display the first portion of the second virtual object on the displayed image.

18 Claims, 17 Drawing Sheets

(58) Field of Classification Search
USPC ........................................................ 345/419
See application file for complete search history.

(56) References Cited

U.S. PATENT DOCUMENTS

| | | | |
|---|---|---|---|
| 2012/0250940 A1* | 10/2012 | Kasahara | G06T 19/006 |
| | | | 382/103 |
| 2013/0268875 A1 | 10/2013 | Han et al. | |
| 2013/0326364 A1 | 12/2013 | Latta et al. | |
| 2014/0098137 A1* | 4/2014 | Fein | G06T 11/00 |
| | | | 345/633 |
| 2014/0292645 A1 | 10/2014 | Tsurumi | |
| 2015/0205126 A1 | 7/2015 | Schowengerdt | |
| 2015/0205399 A1 | 7/2015 | Kim | |
| 2017/0329488 A1 | 11/2017 | Welker et al. | |
| 2018/0109751 A1 | 4/2018 | Choi et al. | |
| 2018/0239425 A1* | 8/2018 | Jang | G06F 3/015 |
| 2019/0179521 A1* | 6/2019 | Han | G06F 9/451 |
| 2019/0384414 A1 | 12/2019 | Woo | |
| 2020/0013206 A1 | 1/2020 | Seely et al. | |
| 2020/0258481 A1 | 8/2020 | Woo et al. | |
| 2022/0084279 A1 | 3/2022 | Lindmeier et al. | |

FOREIGN PATENT DOCUMENTS

| | | | |
|---|---|---|---|
| JP | 2023-65528 | A | 5/2023 |
| KR | 10-2013-0113978 | A | 10/2013 |
| KR | 10-1638914 | B1 | 7/2016 |
| KR | 10-2016-0091402 | A | 8/2016 |
| KR | 10-2017-0062266 | A | 6/2017 |
| KR | 10-2018-0042551 | A | 4/2018 |
| KR | 10-1846168 | B1 | 4/2018 |
| KR | 10-2019-0080243 | A | 7/2019 |
| KR | 10-2019-0095183 | A | 8/2019 |
| KR | 10-2072732 | B1 | 2/2020 |
| KR | 10-2021-0011705 | A | 2/2021 |
| KR | 10-2023-0063829 | A | 5/2023 |

OTHER PUBLICATIONS

Written Opinion issued on Jul. 26, 2023 by International Searching Authority in International Application No. PCT/KR2023/006711.
Communication dated May 6, 2025, issued by the European Patent Office in European Application No. 23850210.8.
Office Action issued on Mar. 31, 2026 by the Indian Patent Office in Indian Patent Application No. 202417085513.

* cited by examiner

400

WEARABLE ELECTRONIC DEVICE DISPLAYING VIRTUAL OBJECT AND METHOD FOR CONTROLLING THE SAME

CROSS REFERENCE TO RELATED APPLICATIONS

This application is a continuation of PCT/KR2023/006711, designating the United States, filed May 17, 2023, in the Korean Intellectual Property Receiving Office, which claims priority to Korean Patent Application No. 10-2022-0097242, filed on Aug. 4, 2022, in the Korean Intellectual Property Office, and Korean Patent Application No. 10-2022-0150955, filed on Nov. 11, 2022, in the Korean Intellectual Property Office. The disclosures of each of these applications are incorporated herein in their entireties.

BACKGROUND

1. Field

Various embodiments of the disclosure relate to a wearable electronic device displaying a virtual object and a method for controlling the same.

2. Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

Further, the electronic device provides various graphic user interfaces (GUIs) for interaction with the user through the display.

In particular, with the development of electronics and communication technologies, electronic devices may come in a more compact and lightweight form factor to be worn on the user's body without discomfort. For example, commercially available wearable electronic devices include head-mounted devices (HMDs), smart watches (or bands), contact lens-type devices, ring-type devices, glove-type devices, shoe-type devices, or clothing-type devices. Since the wearable electronic device is directly worn on the user's body, more portability and user accessibility may be obtained.

The head mounting-type electronic device is a device used while being worn on the user's head or face and may provide augmented reality (AR) to the user. For example, a glasses-type head mounting device providing augmented reality may provide information regarding objects in the form of images or texts to the user in at least a partial space of the user's field of view.

SUMMARY

A wearable electronic device may include: a display; a camera; and at least one processor operatively connected with the display and the camera.

According to an embodiment, the at least one processor may be configured to, control to display an image obtained by the camera on the display.

According to an embodiment, the at least one processor may be configured to, control to display a first virtual object in a partial area of the displayed image.

According to an embodiment, the at least one processor may be configured to, control to replace the displayed first virtual object with an enlarged second virtual object based on receiving a user input to enlarge the first virtual object through the camera.

According to an embodiment, the at least one processor may be configured to, based on a size of the second virtual object exceeding a set value, map a first portion of the second virtual object to an area corresponding to the displayed image.

According to an embodiment, the at least one processor may be configured to, based on the size of the second virtual object exceeding the set value, map a remaining portion of the second virtual object that does not include the first portion to a surrounding area of the area corresponding to the displayed image, and based on the size of the second virtual object exceeding the set value.

According to an embodiment, the at least one processor may be configured to, control to display the first portion of the second virtual object on the displayed image.

According to an embodiment, the at least one processor may be further configured to control to display the second virtual object on the displayed image such that at least one of a plurality of virtual elements included in the first virtual object is rearranged in the second virtual object.

According to an embodiment, at least one of the plurality of virtual elements included in the second virtual object may be obtained by changing a size and/or information of at least one of the plurality of virtual elements included in the first virtual object.

According to an embodiment, the at least one processor may be further configured to rearrange at least one of the plurality of virtual elements included in the first virtual object, based on at least one of a position or size of at least one object in a real space displayed on the displayed image.

According to an embodiment, the first virtual object and the second virtual object, may include at least one user interface for controlling an application corresponding to the first virtual object and the second virtual object.

According to an embodiment, the at least one processor may be further configured to: replace the first virtual object with the second virtual object while maintaining a size and/or position of the at least one user interface between the first virtual object and the second virtual object.

According to an embodiment, the surrounding area of the area corresponding to the image may be a 360-degree virtual space surrounding a position of a user wearing the wearable electronic device.

According to an embodiment, the at least one processor may be further configured to control to display another portion of the second virtual object, based on the image obtained by the camera being changed by a movement of the wearable electronic device.

According to an embodiment, the second virtual object may be fixed in a virtual space.

According to an embodiment, the at least one processor may be further configured to control to display a whole of the second virtual object on the displayed image, based on the image obtained by the camera being changed by a relocation of the wearable electronic device.

According to an embodiment, the second virtual object may be fixed to a user wearing the wearable electronic device.

According to an embodiment, the at least one processor may be further configured to control to continue to display the first portion of the second virtual object, based on the image obtained by the camera being changed by a relocation of the wearable electronic device.

According to an embodiment, the first virtual object may be a 3D virtual object obtained based on a user input to enlarge a 2D third virtual object.

According to an embodiment, the at least one processor may be further configured to replace the first virtual object with the second virtual object that further includes a board-shaped virtual element configured to attach/detach another virtual object, based on the user input.

A method for controlling a wearable electronic device that includes a camera and a display may include displaying an image obtained by the camera on the display.

According to an embodiment, the method may include displaying a first virtual object in a partial area of the displayed image.

According to an embodiment, the method may include replacing the first virtual object with an enlarged second virtual object based on receiving a user input to enlarge the first virtual object through the camera.

According to an embodiment, the method may include, based on a size of the second virtual object exceeding a set value, mapping a first portion of the second virtual object to an area corresponding to the displayed image.

According to an embodiment, the method may include, based on the size of the second virtual object exceeding the set value, mapping a remaining portion of the second virtual object that does not include the first portion to a surrounding area of the area corresponding to the image and displaying the first portion of the second virtual object on the displayed image.

According to an embodiment, displaying the portion of the second virtual object on the displayed image may include displaying, on the displayed image, the second virtual object such that at least one of a plurality of virtual elements included in the first virtual object is rearranged in the second virtual object.

According to an embodiment, at least one of the plurality of virtual elements included in the second virtual object may be obtained by changing a size and/or information of at least one of the plurality of virtual elements included in the first virtual object.

According to an embodiment, replacing the first virtual object with the enlarged into the second virtual object may include rearranging at least one of the plurality of virtual elements included in the first virtual object, based on at least one of a position or size of at least one object in a real space displayed on the displayed image.

According to an embodiment, the first virtual object and the second virtual object may include at least one user interface for controlling an application corresponding to the first virtual object and the second virtual object.

According to an embodiment, replacing the first virtual object with the enlarged into the second virtual object may include replacing the first virtual object with the second virtual object while maintaining a size and/or position of the at least one user interface between the first virtual object and the second virtual object.

According to an embodiment, the surrounding area of the area corresponding to the image may be a 360-degree virtual space surrounding a position of a user wearing the wearable electronic device.

According to an embodiment, the method may further include displaying another portion of the second virtual object, based on the image obtained by the camera being changed by a movement of the wearable electronic device.

According to an embodiment, the second virtual object may be fixed in a virtual space. The method may further include displaying a whole of the second virtual object on the displayed image, based on the image obtained by the camera being changed by a relocation of the wearable electronic device.

According to an embodiment, the second virtual object may be fixed to a user wearing the wearable electronic device.

According to an embodiment, the method may further include continuing to display the first portion of the second virtual object, based on the image obtained by the camera being changed by a relocation of the wearable electronic device.

According to an embodiment, the first virtual object may be a 3D virtual object obtained based on a user input to enlarge a 2D third virtual object.

According to an embodiment, the method may further include replacing the first virtual object with the second virtual object that further includes a board-shaped virtual element configured to attach/detach another virtual object, based on the user input.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
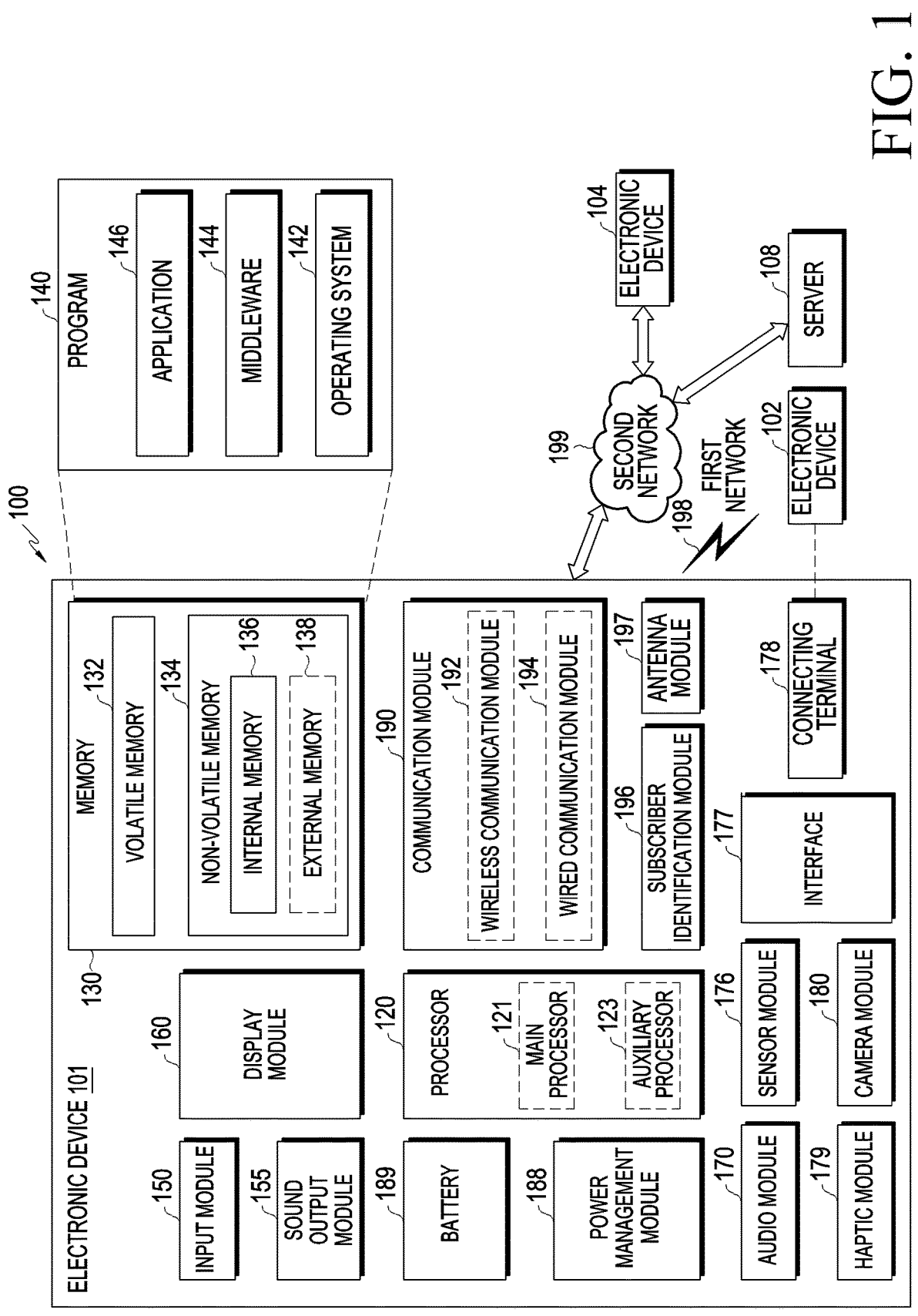
FIG. 1 is a block diagram illustrating an electronic device in a network environment according to an embodiment; embodiment.

FIG. 1 is a block diagram illustrating an electronic device 101 in a network environment 100 according to an embodiment. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
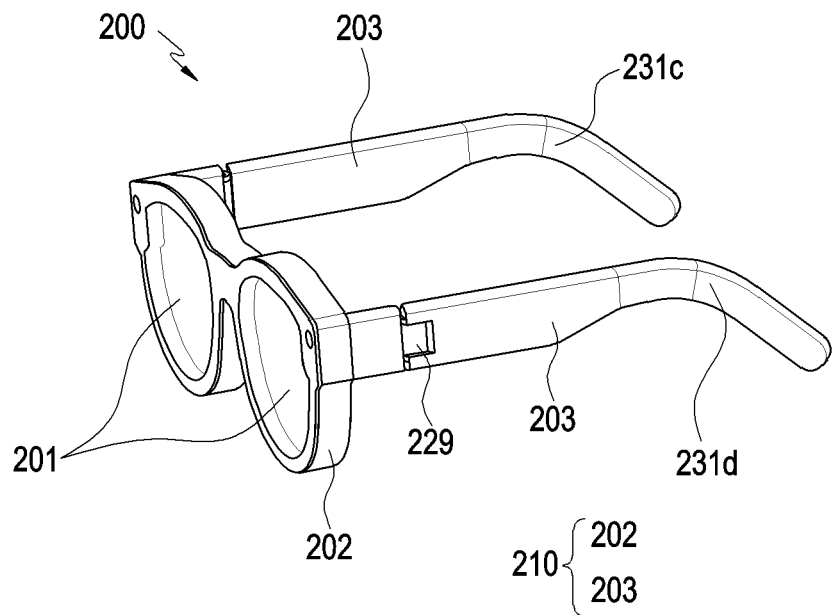
FIG. 2 is a perspective view illustrating an electronic device according to an FIG. 3 is a first perspective view illustrating an internal configuration of an electronic device according to an embodiment.

FIG. 2 is a perspective view illustrating an electronic device 200 (e.g., the electronic device 101 of FIG. 1) according to an embodiment.

Referring to FIG. 2, the electronic device 200 may be a glasses-type wearable electronic device, and the user may visually recognize her surrounding objects or environment while wearing the electronic device 200. For example, the electronic device 200 may be a head-mounted device (HMD) or smart glasses capable of providing images directly in front of the user's eyes. For example, the electronic device 200 may be a virtual reality (VR) device. For example, the electronic device may be a video see-through (VST) device. The configuration of the electronic device 200 of FIG. 2 may be identical in whole or part to the configuration of the electronic device 101 of FIG. 1.

According to an embodiment, the electronic device 200 may include a housing that forms the exterior of the electronic device 200. The housing 210 may provide a space in which components of the electronic device 200 may be disposed. For example, the housing 210 may include a lens frame 202 and at least one wearing member 203.

According to an embodiment, the electronic device 200 may include at least one display member 201 capable of providing the user with visual information. For example, the display member 201 may include a module equipped with a lens, a display, a waveguide, and/or a touch circuit. According to an embodiment, the display member 201 may be transparent or translucent. According to an embodiment, the display member 201 may include a semi-transparent glass or a window member the light transmittance of which may be adjusted as the coloring concentration is adjusted. According to an embodiment, a pair of display members 201 may be provided and disposed to correspond to the user's left and right eyes, respectively, with the electronic device 200 worn on the user's body.

According to an embodiment, the lens frame 202 may receive at least a portion of the display member 201. For example, the lens frame 202 may surround at least a portion of the display member 201. According to an embodiment, the lens frame 202 may position at least one of the display members 201 to correspond to the user's eye. According to an embodiment, the lens frame 202 may be the rim of a normal eyeglass structure. According to an embodiment, the lens frame 202 may include at least one closed loop surrounding the display devices 201.

According to an embodiment, the wearing members 203 may extend from the lens frame 202. For example, the wearing members 203 may extend from ends of the lens frame 202 and, together with the lens frame 202, may be supported and/or positioned on a part (e.g., ears) of the user's body. According to an embodiment, the wearing members 203 may be rotatably coupled to the lens frame 202 through hinge structures 229. According to an embodiment, the wearing member 203 may include an inner side surface 231*c* configured to face the user's body and an outer side surface 231*d* opposite to the inner side surface.

According to an embodiment, the electronic device 200 may include the hinge structures 229 configured to fold the wearing members 203 on the lens frame 202. The hinge structure 229 may be disposed between the lens frame 202 and the wearing member 203. While the electronic device 200 is not worn, the user may fold the wearing members 203 on the lens frame 202 to carry or store the electronic device.

Figure 3:
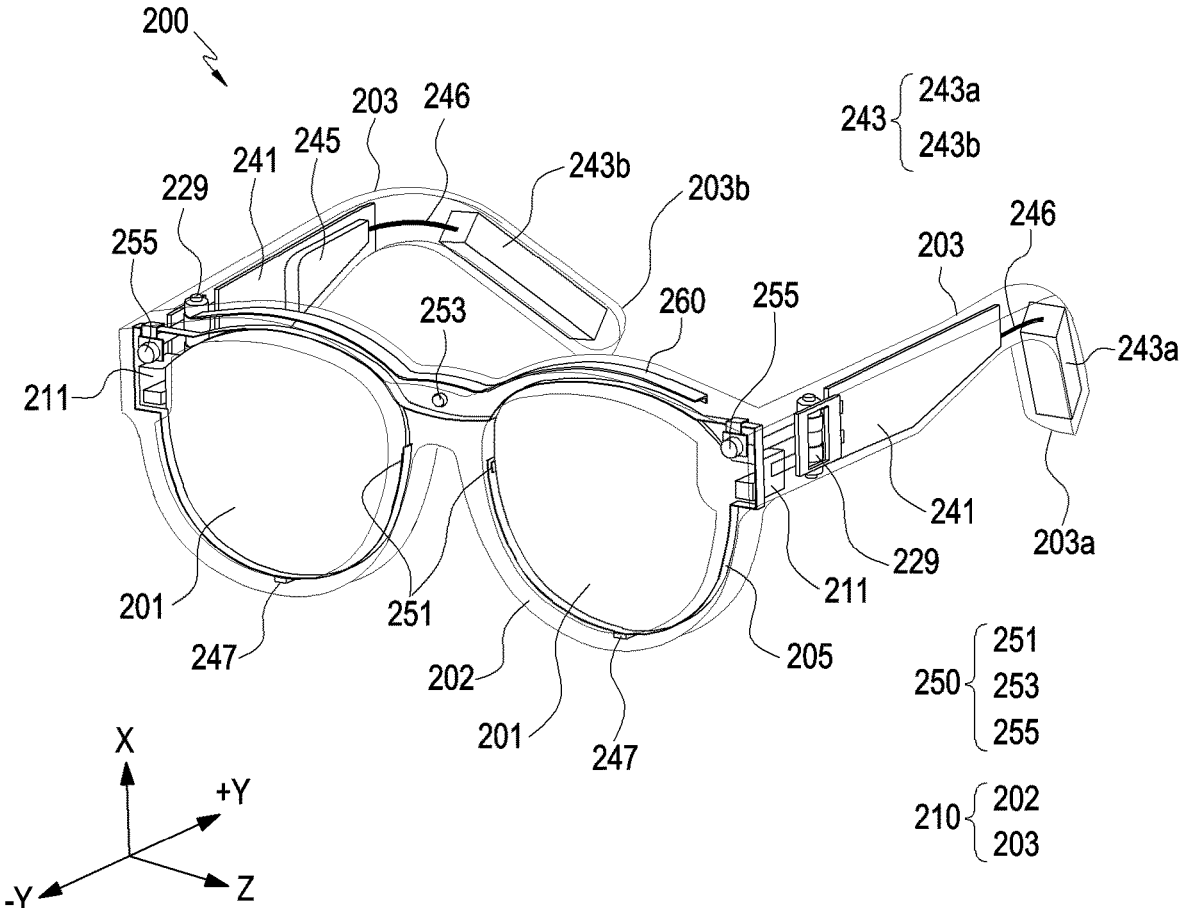
Figure 4:
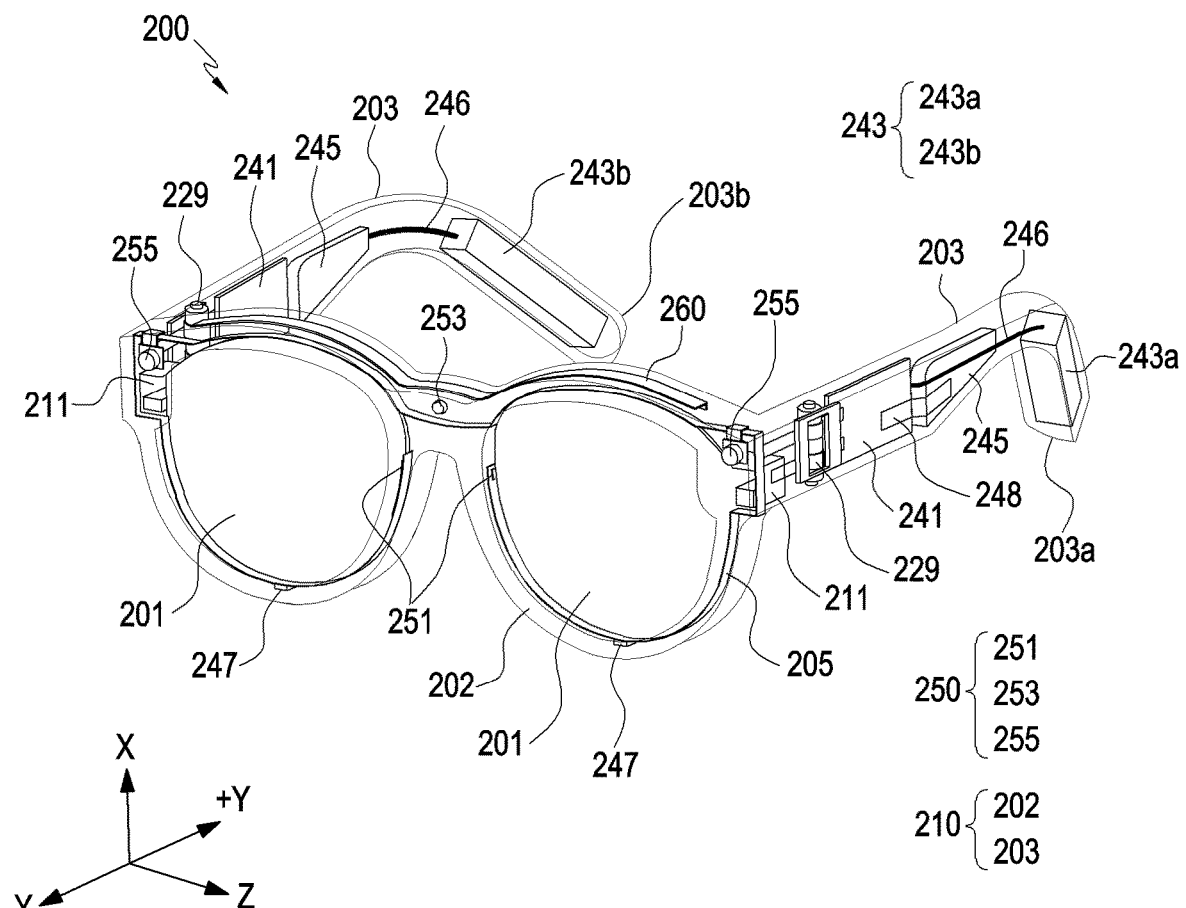
FIG. 4 is a second perspective view illustrating an internal configuration of an electronic device according to an embodiment.
Figure 5:
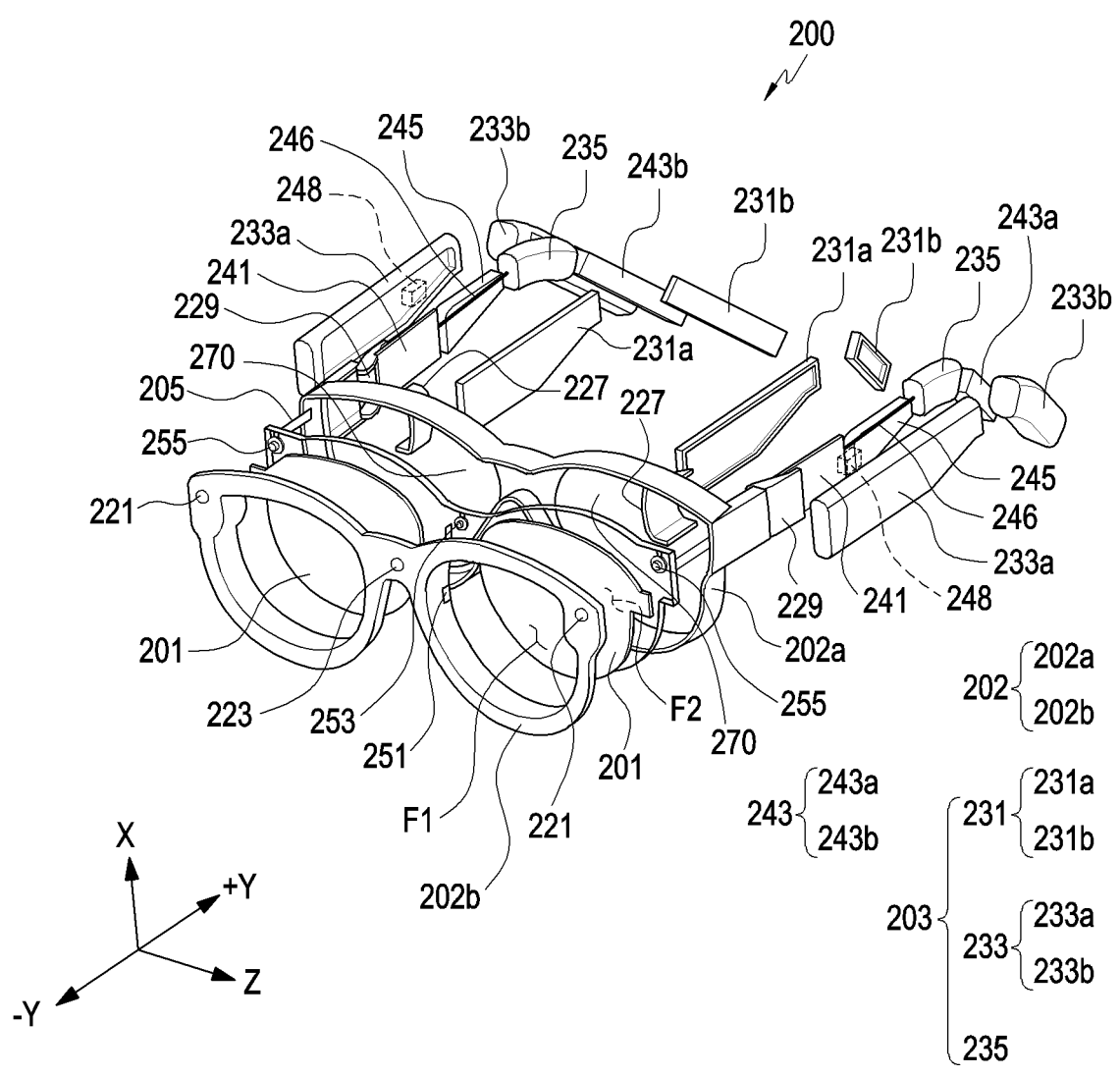
FIG. 5 is an exploded perspective view illustrating an electronic device according to an embodiment.

FIG. 3 is a first perspective view illustrating an internal configuration of an electronic device according to various embodiments. FIG. 4 is a second perspective view illustrating an internal configuration of an electronic device according to various embodiments. FIG. 5 is an exploded perspective view illustrating an electronic device according to various embodiments.

Referring to FIGS. 3 to 5, an electronic device 200 may include components received in the housing 210 (e.g., at least one circuit board 241 (e.g., printed circuit board (PCB), printed board assembly (PBA), flexible PCB, or rigid-flexible PCB (RFPCB)), at least one battery 243, at least one speaker module 245, at least one power transfer structure 246, and a camera module 250). The configuration of the housing 210 of FIGS. 3 and 4 may be identical in whole or part to the configuration of the display members 201, the lens frame 202, the wearing members 203, and the hinge structures 229 of FIG. 2.

According to an embodiment, the electronic device 200 may obtain and/or recognize a visual image regarding an object or environment in the direction (e.g., −Y direction) in which the electronic device 200 faces or the direction in which the user gazes, using the camera module 250 (e.g., the camera module 180 of FIG. 1) and may receive information regarding the object or environment from an external electronic device (e.g., the electronic device 102 or 104 or the server 108 of FIG. 1) through a network (e.g., the first network 198 or second network 199 of FIG. 1). In another embodiment, the electronic device 200 may provide the received object- or environment-related information, in the form of an audio or visual form, to the user. The electronic device 200 may provide the received object- or environment-related information, in a visual form, to the user through the display members 201, using the display module (e.g., the display module 160 of FIG. 1). For example, the electronic device 200 may implement augmented reality (AR) by implementing the object- or environment-related information in a visual form and combining it with an actual image of the user's surrounding environment.

According to an embodiment, the display member 201 may include a first surface F1 facing in a direction (e.g., −y direction) in which external light is incident and a second surface F2 facing in a direction (e.g., +y direction) opposite to the first surface F1. With the user wearing the electronic device 200, at least a portion of the light or image coming through the first surface F1 may be incident on the user's left eye and/or right eye through the second surface F2 of the display member 201 disposed to face the user's left eye and/or right eye.

According to an embodiment, the lens frame 202 may include at least two or more frames. For example, the lens frame 202 may include a first frame 202a and a second frame 202b. According to an embodiment, when the user wears the electronic device 200, the first frame 202a may be a frame of the portion facing the user's face, and the second frame 202b may be a portion of the lens frame 202 spaced from the first frame 202a in the gazing direction (e.g., −Y direction) in which the user gazes.

According to an embodiment, the light output module 211 may provide an image and/or video to the user. For example, the light output module 211 may include a display panel (not shown) capable of outputting images and a lens (not shown) corresponding to the user's eye and guiding images to the display member 201. For example, the user may obtain the image output from the display panel of the light output module 211 through the lens of the light output module 211. According to an embodiment, the light output module 211 may include a device configured to display various information. For example, the light output module 211 may include at least one of a liquid crystal display (LCD), a digital mirror device (DMD), a liquid crystal on silicon (LCoS), or an organic light emitting diode (OLED), or a micro light emitting diode (micro LED). According to an embodiment, when the light output module 211 and/or the display member 201 includes one of a liquid crystal display device, a digital mirror display device, or a silicon liquid crystal display device, the electronic device 200 may include a light output module 211 and/or a light source emitting light to the display area of the display member 201. According to another embodiment, when the light output module 211 and/or the display member 201 includes organic light emitting diodes or micro LEDs, the electronic device 200 may provide virtual images to the user without a separate light source.

According to an embodiment, at least a portion of the light output module 211 may be disposed in the housing 210. For example, the light output module 211 may be disposed in the wearing member 203 or the lens frame 202 to correspond to each of the user's right eye and left eye. According to an embodiment, the light output module 211 may be connected to the display member 201 and may provide images to the user through the display member 201. For example, the image output from the light output module 211 may be incident on the display member 201 through an input optical member positioned at an end of the display member 201 and be radiated to the user's eyes through a waveguide and an output optical member positioned in at least a portion of the display member 201. According to an embodiment, the waveguide may be formed of glass, plastic, or polymer. The waveguide may include a nano pattern formed on one surface of the inside or outside, e.g., a grating structure having a polygonal or curved shape. According to an embodiment, the waveguide may include at least one diffractive element, e.g., at least one of a diffractive optical element (DOE), a holographic optical element (HOE), or a reflective element (e.g., a reflective mirror).

According to an embodiment, the circuit board 241 may include components for driving the electronic device 200. For example, the circuit board 241 may include at least one integrated circuit chip. Further, at least one of the processor 120, the memory 130, the power management module 188, or the communication module 190 of FIG. 1 may be provided in the integrated circuit chip. According to an embodiment, a circuit board 241 may be disposed in the wearing member 203 of the housing 210. According to an embodiment, the circuit board 241 may be electrically connected to the battery 243 through the power transfer structure 246. According to an embodiment, the circuit board 241 may be connected to the flexible printed circuit board 205 and may transfer electrical signals to the electronic components (e.g., the light output module 211, the camera module 250, and the light emitting unit) of the electronic device through the flexible printed circuit board 205. According to an embodiment, the circuit board 241 may be an interposer circuit board.

According to various embodiments, the flexible printed circuit board 205 may extend from the circuit board 241 through the hinge structure 229 to the inside of the lens frame 202 and may be disposed in at least a portion of the inside of the lens frame 202 around the display member 201.

According to an embodiment, the battery 243 (e.g., the battery 189 of FIG. 1) may be connected with components (e.g., the light output module 211, the circuit board 241, and the speaker module 245, the microphone module 247, and/or the camera module 250) of the electronic device 200 and may supply power to the components of the electronic device 200.

According to an embodiment, at least a portion of the battery 243 may be disposed in the wearing member 203. According to an embodiment, batteries 243 may be disposed adjacent to ends 203a and 203b of the wearing members 203. For example, the batteries 243 may include a first battery 243a disposed in a first end 203a of the wearing member 203 and a second battery 243b disposed in a second end 203b of the wearing member 203.

According to various embodiments, the speaker module 245 (e.g., the audio module 170 or the sound output module 155 of FIG. 1) may convert an electrical signal into sound. At least a portion of the speaker module 245 may be disposed in the wearing member 203 of the housing 210. According to an embodiment, the speaker module 245 may be located in the wearing member 203 to correspond to the user's ear. According to an embodiment (e.g., FIG. 3), the speaker module 245 may be disposed on the circuit board 241. For example, the speaker module 245 may be disposed between the circuit board 241 and the inner case (e.g., the inner case 231 of FIG. 5). According to an embodiment (e.g., FIG. 4), the speaker module 245 may be disposed next to the circuit board 241. For example, the speaker module 245 may be disposed between the circuit board 241 and the battery 243.

According to an embodiment, the electronic device 200 may include a connection member 248 connected with the speaker module 245 and the circuit board 241. The connection member 248 may transfer at least part of the sound and/or vibration generated by the speaker module 245 to the circuit board 241. According to an embodiment, the connection member 248 may be integrally formed with the speaker module 245. For example, a portion extending from the speaker frame of the speaker module 245 may be interpreted as the connection member 248. According to an embodiment (e.g., FIG. 3), the connection member 248 may be omitted. For example, when the speaker module 245 is disposed on the circuit board 241, the connection member 248 may be omitted.

According to an embodiment, the power transfer structure 246 may transfer the power from the battery 243 to an electronic component (e.g., the light output module 211) of the electronic device 200. For example, the power transfer structure 246 may be electrically connected to the battery 243 and/or the circuit board 241, and the circuit board 241 may transfer the power received through the power transfer structure 246 to the light output module 211.

According to an embodiment, the power transfer structure 246 may be a component capable of transferring power. For example, the power transfer structure 246 may include a flexible printed circuit board or wiring. For example, the wiring may include a plurality of cables (not shown). In various embodiments, various changes may be made to the shape of the power transfer structure 246 considering the number and/or type of the cables.

According to an embodiment, the microphone module 247 (e.g., the input module 150 and/or the audio module 170 of FIG. 1) may convert a sound into an electrical signal. According to an embodiment, the microphone module 247 may be disposed in at least a portion of the lens frame 202. For example, at least one microphone module 247 may be disposed on a lower end (e.g., in the −X-axis direction) and/or on an upper end (e.g., in the +X-axis direction) of the electronic device 200. According to an embodiment, the electronic device 200 may more clearly recognize the user's voice using voice information (e.g., sound) obtained by the at least one microphone module 247. For example, the electronic device 200 may distinguish the voice information from the ambient noise based on the obtained voice information and/or additional information (e.g., low-frequency vibration of the user's skin and bones). For example, the electronic device 200 may clearly recognize the user's voice and may perform a function of reducing ambient noise (e.g., noise canceling).

According to an embodiment, the camera module 250 may capture a still image and/or a video. The camera module 250 may include at least one of a lens, at least one image sensor, an image signal processor, or a flash. According to an embodiment, the camera module 250 may be disposed in the lens frame 202 and may be disposed around the display member 201.

According to an embodiment, the camera module 250 may include at least one first camera module 251. According to an embodiment, the first camera module 251 may capture the trajectory of the user's eye (e.g., a pupil) or gaze. For example, the first camera module 251 may capture the reflection pattern of the light emitted by the light emitting unit to the user's eyes. For example, the light emitting unit may emit light in an infrared band for tracking the trajectory of the gaze using the first camera module 251. For example, the light emitting unit may include an IR LED. According to an embodiment, the processor (e.g., the processor 120 of FIG. 1) may adjust the position of the virtual image so that the virtual image projected on the display member 201 corresponds to the direction in which the user's pupil gazes. According to an embodiment, the first camera module 251 may include a global shutter (GS)-type camera. It is possible to track the trajectory of the user's eyes or gaze using a plurality of third camera modules 251 having the same specifications and performance.

According to various embodiments, the first camera module 251 may periodically or aperiodically transmit information related to the trajectory of the user's eye or gaze (e.g., trajectory information) to the processor (e.g., the processor 120 of FIG. 1). According to another embodiment, when the first camera module 251 detects a change in the user's gaze based on the trajectory information (e.g., when the user's eyes move more than a reference value with the head positioned still), the first camera module 251 may transmit the trajectory information to the processor.

According to an embodiment, the camera modules 250 may include at least one second camera module 253. According to an embodiment, the second camera module 253 may capture an external image. According to an embodiment, the second camera module 253 may be a global shutter-type or rolling shutter (RS)-type camera. According to an embodiment, the second camera module 253 may capture an external image through the second optical hole 223 formed in the second frame 202b. For example, the second camera module 253 may include a high-resolution color camera, and it may be a high resolution (HR) or photo video (PV) camera. Further, the second camera module 253 may provide an auto-focus (AF) function and an optical image stabilizer (OIS) function.

According to various embodiments (not shown), the electronic device 200 may include a flash (not shown) positioned adjacent to the second camera module 253. For example, the flash (not shown) may provide light for increasing brightness (e.g., illuminance) around the electronic device 200 when an external image is obtained by the second camera module 253, thereby reducing difficulty in obtaining an image due to the dark environment, the mixing of various light beams, and/or the reflection of light.

According to an embodiment, the camera modules 250 may include at least one third camera module 255. According to an embodiment, the third camera module 255 may capture the user's motion through a first optical hole 221 formed in the lens frame 202. For example, the third camera module 255 may capture the user's gesture (e.g., hand gesture). Third camera modules 255 and/or first optical holes 221 may be disposed on two opposite sides of the lens frame 202 (e.g., the second frame 202*b*), e.g., formed in two opposite ends of the lens frame 202 (e.g., the second frame 202*b*) with respect to the X direction. According to an embodiment, the third camera module 255 may be a global shutter (GS)-type camera. For example, the third camera module 255 may be a camera supporting 3 DoF (degrees of freedom) or 6 DoF, which may provide position recognition and/or motion recognition in a 360-degree space (e.g., omni-directionally). According to an embodiment, the third camera modules 255 may be stereo cameras and may perform the functions of simultaneous localization and mapping (SLAM) and user motion recognition using a plurality of global shutter-type cameras with the same specifications and performance. According to an embodiment, the third camera module 255 may include an infrared (IR) camera (e.g., a time of flight (TOF) camera or a structured light camera). For example, the IR camera may be operated as at least a portion of a sensor module (e.g., the sensor module 176 of FIG. 1) for detecting a distance from the subject.

According to an embodiment, at least one of the first camera module 251 or the third camera module 255 may be replaced with a sensor module (e.g., the sensor module 176 of FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera module 251, the second camera module 253, and the third camera module 255 may include a plurality of camera modules (not shown). For example, the second camera module 253 may include a plurality of lenses (e.g., wide-angle and telephoto lenses) and image sensors and may be disposed on one surface (e.g., a surface facing in the –Y axis) of the electronic device 200. For example, the electronic device 200 may include a plurality of camera modules having different properties (e.g., angle of view) or functions and control to change the angle of view of the camera module based on the user's selection and/or trajectory information. At least one of the plurality of camera modules may be a wide-angle camera and at least another of the plurality of camera modules may form a telephoto camera.

According to various embodiments, the processor (e.g., processor 120 of FIG. 1) may determine the motion of the electronic device 200 and/or the user's motion using information for the electronic device 200 obtained using at least one of a gesture sensor, a gyro sensor, or an acceleration sensor of the sensor module (e.g., the sensor module 176 of FIG. 1) and the user's action (e.g., approach of the user's body to the electronic device 200) obtained using the third camera module 255. According to an embodiment, in addition to the above-described sensor, the electronic device 200 may include a magnetic (geomagnetic) sensor capable of measuring an orientation using a magnetic field and magnetic force lines and/or a hall sensor capable of obtaining motion information (e.g., moving direction or distance) using the strength of a magnetic field. For example, the processor may determine the motion of the electronic device 200 and/or the user's motion based on information obtained from the magnetic (geomagnetic) sensor and/or the hall sensor.

According to various embodiments (not shown), the electronic device 200 may perform an input function (e.g., a touch and/or pressure sensing function) capable of interacting with the user. For example, a component configured to perform a touch and/or pressure sensing function (e.g., a touch sensor and/or a pressure sensor) may be disposed in at least a portion of the wearing member 203. The electronic device 200 may control the virtual image output through the display member 201 based on the information obtained through the components. For example, a sensor associated with a touch and/or pressure sensing function may be configured in various types, e.g., a resistive type, a capacitive type, an electro-magnetic (EM) type, or an optical type. According to an embodiment, the component configured to perform the touch and/or pressure sensing function may be identical in whole or part to the configuration of the input module 150 of FIG. 1.

According to an embodiment, the electronic device 200 may including a reinforcing member 260 that is disposed in an inner space of the lens frame 202 and formed to have a higher rigidity than that of the lens frame 202.

According to an embodiment, the electronic device 200 may include a lens structure 270. The lens structure 270 may refract at least a portion of light. For example, the lens structure 270 may be a prescription lens having a designated refractive power. According to an embodiment, the housing 210 may include a hinge cover 227 that may conceal a portion of the hinge structure 229. Another part of the hinge structure 229 may be received or hidden between an inner case 231 and an outer case 233, which are described below.

According to various embodiments, the wearing member 203 may include the inner case 231 and the outer case 233. The inner case 231 may be, e.g., a case configured to face the user's body or directly contact the user's body, and may be formed of a material having low thermal conductivity, e.g., a synthetic resin. According to an embodiment, the inner case 231 may include an inner side surface (e.g., the inner side surface 231*c* of FIG. 2) facing the user's body. The outer case 233 may include, e.g., a material (e.g., a metal) capable of at least partially transferring heat and may be coupled to the inner case 231 to face each other. According to an embodiment, the outer case 233 may include an outer side surface (e.g., the outer side surface 231*d* of FIG. 2) opposite to the inner side surface 331*c*. In an embodiment, at least one of the circuit board 241 or the speaker module 245 may be received in a space separated from the battery 243 in the wearing member 203. In the illustrated embodiment, the inner case 231 may include a first case 231*a* including the circuit board 241 and/or the speaker module 245 and a second case 231*b* receiving the battery 243, and the outer case 233 may include a third case 233*a* coupled to face the first case 231*a* and a fourth case 233*b* coupled to face the second case 231*b*. For example, the first case 231*a* and the third case 233*a* may be coupled (hereinafter, 'first case portions 231*a* and 233*a*') to receive the circuit board 241 and/or the speaker module 245, and the second case 231*b* and the fourth case 233*b* may be coupled (hereinafter, 'second case portions 231*b* and 233*b*') to receive the battery 343.

According to an embodiment, the first case portions 231*a* and 233*a* may be rotatably coupled to the lens frame 202 through the hinge structure 229, and the second case portions 231*b* and 233*b* may be connected or mounted to the ends of the first case portions 231*a* and 233*a* through the connecting structure 235. In some embodiments, a portion of the connecting structure 235 in contact with the user's body may be formed of a material having low thermal conductivity, e.g., an elastic material, such as silicone, polyurethane, or rubber, and another portion thereof which does not come into contact with the user's body may be formed of a material having high thermal conductivity (e.g., a metal). For example, when heat is generated from the circuit board 241 or the battery 243, the connecting structure 235 may block heat transfer to the portion in contact with the user's body while dissipating or discharging heat through the portion not in contact with the user's body. According to an embodiment, a portion of the connecting structure 235 configured to come into contact with the user's body may be interpreted as a portion of the inner case 231, and a portion of the connecting structure 235 that does not come into contact with the user's body may be interpreted as a portion of the outer case 233. According to an embodiment (not shown), the first case 231a and the second case 231b may be integrally configured without the connecting structure 235, and the third case 233a and the fourth case 233b may be integrally configured without the connecting structure 235. According to various embodiments, other components (e.g., the antenna module 197 of FIG. 1) may be further included in addition to the illustrated components, and information regarding an object or environment may be received from an external electronic device (e.g., the electronic device 102 or 104 or server 108 of FIG. 1) through a network (e.g., the first network 198 or second network 199 of FIG. 1) using the communication module 190.

Figure 6:
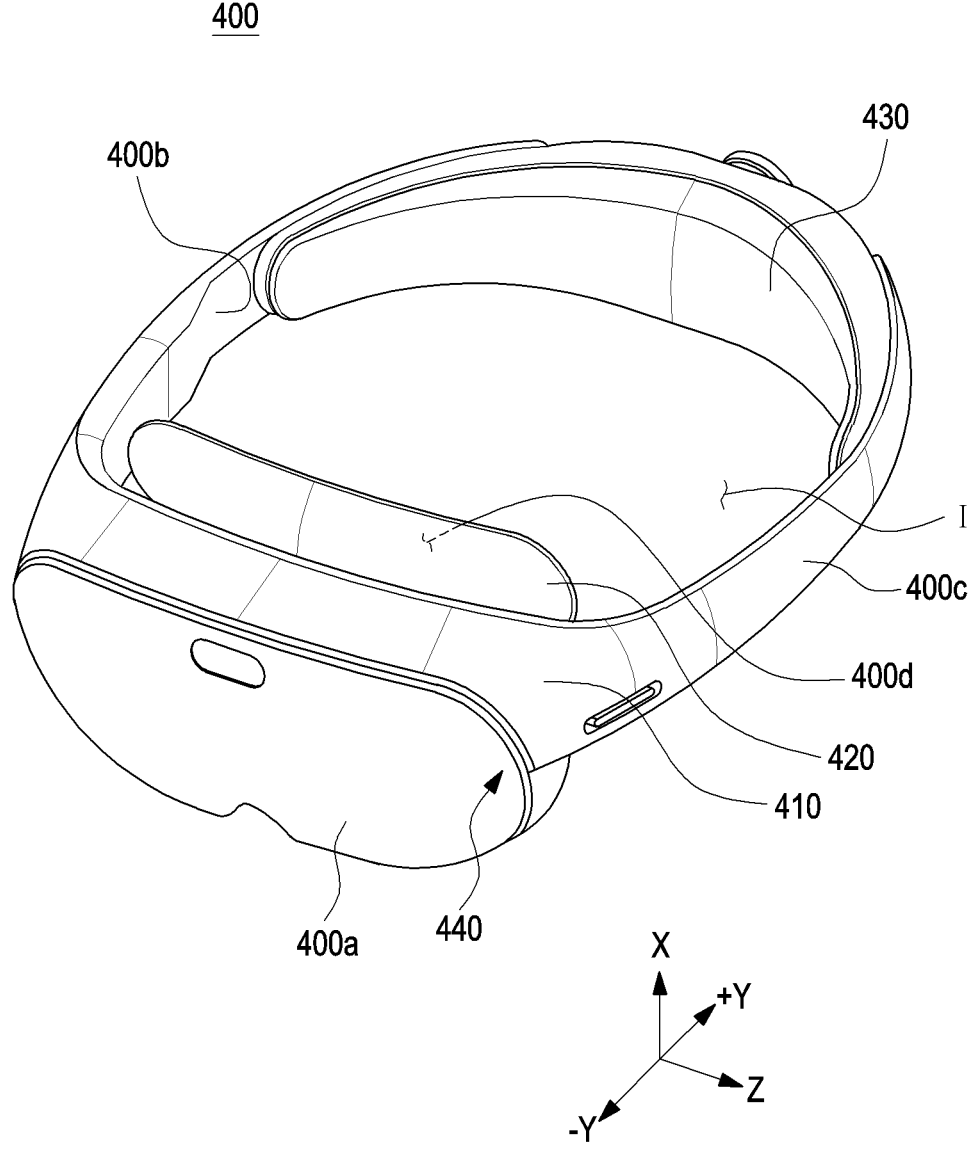
FIG. 6 is another perspective view illustrating a wearable electronic device according to various embodiments of the disclosure.

FIG. 6 is another perspective view illustrating an electronic device according to various embodiments of the disclosure.

Referring to FIG. 6, an electronic device 400 may be a head mounting device (HMD) capable of providing an image in front of the user's eyes. The configuration of the electronic device 400 of FIG. 6 may be identical in whole or part to the configuration of the electronic device 200 of FIG. 2.

According to various embodiments, the electronic device 400 may form the exterior of the electronic device 400 and may include housings 410, 420, and 430 that may provide a space in which components of the electronic device 400 may be disposed.

According to various embodiments, the electronic device 400 may include a first housing 410 that may surround at least a portion of the user's head. According to an embodiment, the first housing 410 may include a first surface 400a facing the outside (e.g., −Y direction) of the electronic device 400.

According to various embodiments, the first housing 410 may surround at least a portion of the inner space I. For example, the first housing 410 may include a second surface 400b facing the inner space I of the electronic device 400 and a third surface 400c opposite to the second surface 400b. According to an embodiment, the first housing 410 may be coupled with the third housing 430 and may be formed in a closed loop shape surrounding the inner space I.

According to various embodiments, the first housing 410 may surround at least some of the components of the electronic device 400. For example, the light output module (e.g., the light output module 211 of FIG. 3), the circuit board (e.g., the circuit board 241 of FIG. 3), and the speaker module 245 may be disposed in the first housing 410.

According to various embodiments, the electronic device 400 may include one display member 440 corresponding to the left eye and the right eye. The display member 440 may be disposed in the first housing 410. The configuration of the display member 440 of FIG. 6 may be identical in whole or part to the configuration of the display member 201 of FIG. 2.

According to various embodiments, the electronic device 400 may include a second housing 420 that may be seated on the user's face. According to an embodiment, the second housing 420 may include a fourth surface 400d that may at least partially face the user's face. According to an embodiment, the fourth surface 400d may be a surface in a direction (e.g., +Y direction) toward the internal space I of the electronic device 400. According to an embodiment, the second housing 420 may be coupled with the first housing 410.

According to various embodiments, the electronic device 400 may include a third housing 430 that may be seated on the back of the user's head. According to an embodiment, the third housing 430 may be coupled with the first housing 410. According to an embodiment, the third housing 430 may surround at least some of the components of the electronic device 400. For example, a battery (e.g., the battery 243 of FIG. 3) may be disposed in the third housing 430.

Figure 7:
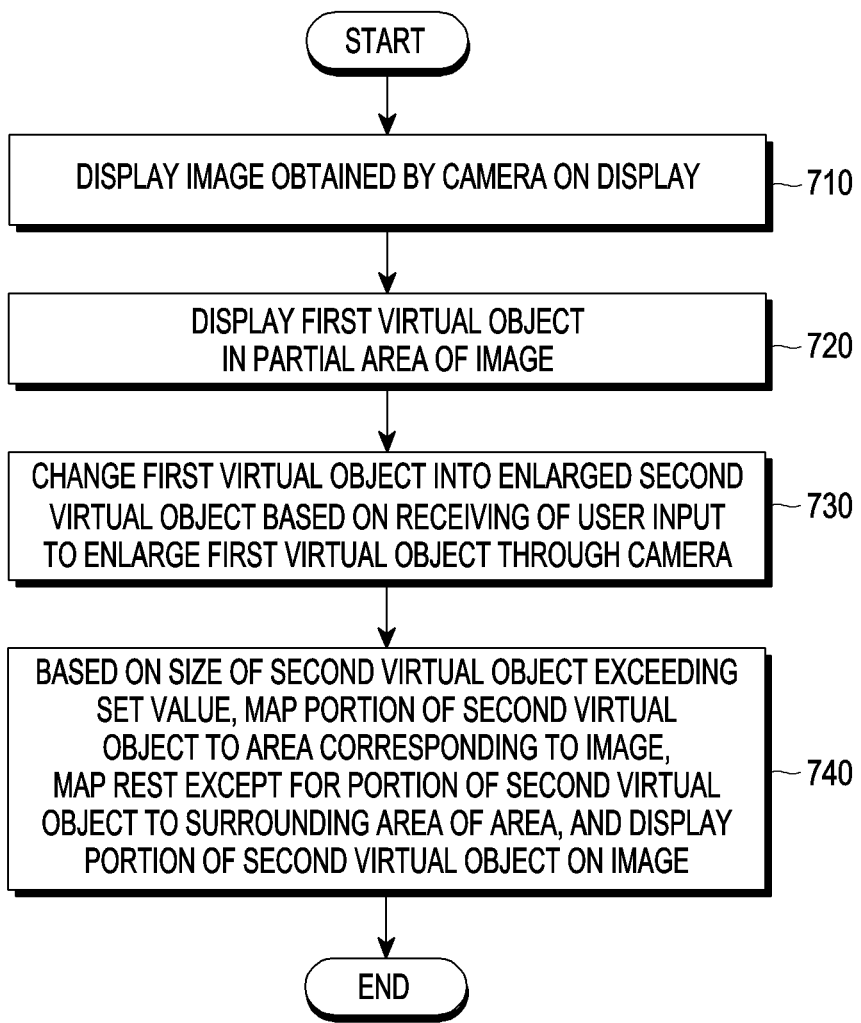
FIG. 7 is a flowchart illustrating an operation of displaying an enlarged virtual object based on a user input by a wearable electronic device according to an embodiment of the disclosure.

FIG. 7 is a flowchart illustrating an operation of displaying an enlarged virtual object based on a user input by a wearable electronic device according to an embodiment of the disclosure.

Referring to FIG. 7, in operation 710, a wearable electronic device (e.g., the electronic device 101 of FIG. 1, the processor 120 of FIG. 1, the electronic device 200 of FIG. 2, or the electronic device 400 of FIG. 6) may display an image obtained through a camera (e.g., the camera module 180 of FIG. 1, the second camera module 253 of FIGS. 2 to 5, or the third camera module 255 of FIGS. 2 to 5) on a display (e.g., the display module 160 of FIG. 1, the display member 201 of FIGS. 2 to 5, or the display member 440 of FIG. 6).

According to an embodiment, the image obtained by the camera may be an image captured for the real space where the wearable electronic device is located. According to an embodiment, the image may include at least one object (e.g., a wall, piece of furniture, home appliance, bottom, human, or thing) disposed in the real space.

According to an embodiment, in operation 720, the wearable electronic device may display a first virtual object in a partial area of the image.

According to an embodiment, the virtual object may be a widget corresponding to an application and/or function executable on the wearable electronic device.

According to an embodiment, the first virtual object may be a 3D virtual object obtained based on a user input for enlarging a 2D third virtual object. According to an embodiment, an embodiment in which the shape of a virtual object is gradually changed by the user input is described below with reference to FIG. 8.

According to an embodiment, the first virtual object may be fixed in a partial area of the image based on a user input disposed on the image.

According to an embodiment, in operation 730, the wearable electronic device may change the first virtual object into an enlarged second virtual object based on receiving a user input to enlarge the first virtual object through the camera.

According to an embodiment, the user input may be a gesture input, a voice input, and/or a gaze tracking input. For example, the user's gesture input for enlarging the first virtual object may be a button touch for enlarging the first virtual object, a double touch, a triple touch, a long touch input on the first virtual object, or a pinch-out using a plurality of fingers of one hand, or a pinch-out using two hands, but is not limited thereto.

According to an embodiment, the wearable electronic device may display a second virtual object in which at least one of the plurality of virtual elements included in the first virtual object has been rearranged, on the image. According to an embodiment, the wearable electronic device may display a second virtual object in which at least one of the plurality of virtual elements included in the first virtual object has been changed in size and/or information, on the image. According to an embodiment, the plurality of virtual elements included in the second virtual object may be ones produced from changing the position, size, and/or information of the plurality of virtual elements included in the first virtual object.

According to an embodiment, the virtual element may be at least one virtual sub object included in one virtual object. According to an embodiment, the virtual element may include 2D/3D text and/or a 2D/3D image.

According to an embodiment, the wearable electronic device may rearrange at least one of the plurality of virtual elements included in the first virtual object based on at least one of the position or size of at least one object in the real space displayed on the image.

According to an embodiment, the wearable electronic device may analyze the structure and size of the real space and the arrangement, size, and/or distances from the wearable electronic device, of real objects (e.g., walls, furniture, home appliances, bottom, humans or things) included in the real space based on the image obtained through the camera.

According to an embodiment, the wearable electronic device may analyze structure and size of the real space and the arrangement, size, and/or distances from the wearable electronic device, of real objects included in the real space, further using at least one sensor (e.g., the sensor module 176 of FIG. 1).

According to an embodiment, the wearable electronic device may change the position and/or size of the plurality of virtual elements included in the first virtual object based on the analysis result.

According to an embodiment, an operation of changing the position, size, and/or information of a plurality of virtual elements included in a virtual object is described below in greater detail with reference to FIGS. 9A and 9B.

According to an embodiment, the first virtual object and the second virtual object may include at least one user interface for controlling an application corresponding to the first virtual object and the second virtual object, as virtual elements. For example, when the application is a music player application, it may include user interfaces, such as music play, pause, previous song, and/or next song.

According to an embodiment, the wearable electronic device may change the first virtual object into a second virtual object in which at least one user interface included in the first virtual object remains in size and/or position.

According to an embodiment, the wearable electronic device may change the first virtual object into a second virtual object in which at least one user interface included in the first virtual object has been changed in size and/or position.

According to an embodiment, an embodiment in which a user interface is included in a virtual object is described below with reference to FIGS. 10A, 10B, and 10C.

According to an embodiment, the wearable electronic device may change the first virtual object into a second virtual object which further includes a board-shaped virtual element for attaching/detaching other virtual objects, based on a user input for enlarging the first virtual object.

According to an embodiment, a virtual object corresponding to a function or application different from that of the first virtual object may be attached/detached to/from the board-shaped virtual element. According to an embodiment, the attachable/detachable virtual object may be a 2D virtual object and/or 3D virtual object, such as a note, photo, or sticker.

According to an embodiment, an embodiment in which a board-shaped virtual element is further included in a first virtual object based on a user input is described below in greater detail with reference to FIGS. 12A and 12B.

According to an embodiment, in operation 740, the wearable electronic device may map a portion of the second virtual object to an area corresponding to the image, map the rest except for the portion of the second virtual object to a surrounding area of the area, and display a portion of the second virtual object on the image based on the size of the second virtual object exceeding a set value.

According to an embodiment, the wearable electronic device may display another portion of the second virtual object based on a change in the image obtained by the camera due to a movement of the wearable electronic device.

According to an embodiment, the surrounding area of the area may be a 360-degree virtual space surrounding the position of the user wearing the wearable electronic device.

According to an embodiment, the wearable electronic device may display a portion of the second virtual object whatever direction capturing is performed by the camera in, based on mapping of the second virtual object to the 360-degree virtual space.

According to an embodiment, an operation of displaying another portion of the second virtual object by a movement of the wearable electronic device is described below with reference to FIGS. 10A and 10C.

According to an embodiment, the second virtual object may be fixed in the virtual space. According to an embodiment, when the position of the wearable electronic device is moved away from the second virtual object fixed in the virtual space by a specific distance or more due to the user's movement, the wearable electronic device may change the image obtained by the camera. According to an embodiment, the wearable electronic device may display the entire second virtual object on the changed image. According to an embodiment, an embodiment in which the second virtual object is fixed in the virtual space is described below with reference to FIG. 11A.

According to an embodiment, the second virtual object may be fixed to the user wearing the wearable electronic device. According to an embodiment, the image obtained by the camera may be changed due to a relocation of the wearable electronic device by the user's movement. According to an embodiment, the wearable electronic device may keep on displaying the portion of the second virtual object although the obtained image is changed due to the relocation. According to an embodiment, an embodiment in which the second virtual object is fixed to the user is described below with reference to FIG. 11B.

Figure 8:
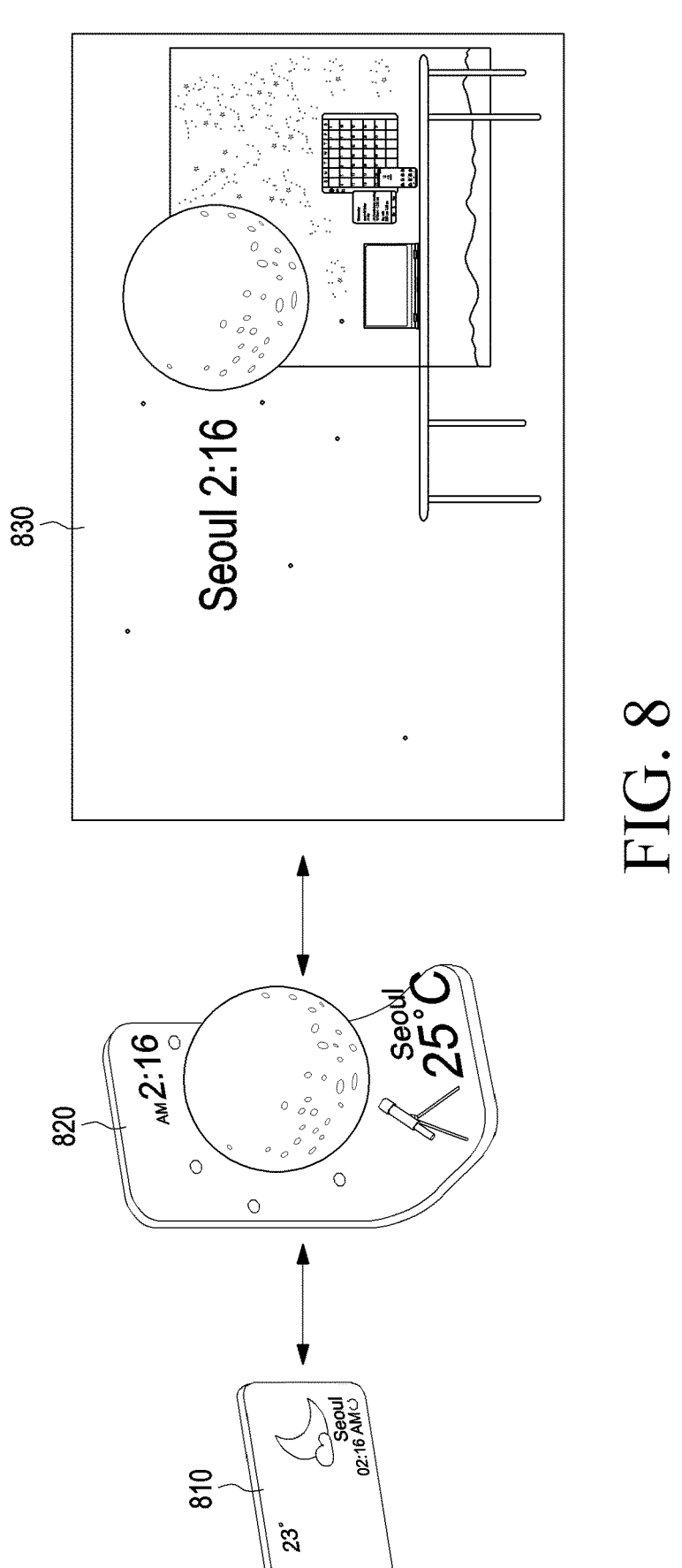
FIG. 8 is a view illustrating an operation of enlarging a virtual object based on a user input according to an embodiment of the disclosure.

FIG. 8 is a view illustrating an operation of enlarging a virtual object based on a user input according to an embodiment of the disclosure.

Referring to FIG. 8, upon receiving a user input to enlarge a first virtual object 820, the wearable electronic device (e.g., the electronic device 101 of FIG. 1, the processor 120 of FIG. 1, the electronic device 200 of FIG. 2, or the electronic device 400 of FIG. 6) may change the first virtual object 820 into an enlarged second virtual object 830.

According to an embodiment, upon receiving a user input to enlarge the first virtual object 820, the wearable electronic device may increase the size of the first virtual object 820 while maintaining the shape of the first virtual object 820 and, if reaching a set size or more, change it into a second virtual object 830.

According to an embodiment, the user input may be a gesture input, a voice input, and/or a gaze tracking input. For example, the user's gesture input for enlarging the first virtual object may be a double touch, or a triple touch the first virtual object, or a pinch-out using a plurality of fingers of one hand, or a pinch-out using two hands, but is not limited thereto.

According to an embodiment, a portion of the second virtual object 830 may be displayed in the area corresponding to the image obtained by the camera (e.g., the camera module 180 of FIG. 1, the second camera module 253 of FIGS. 2 to 5, or the third camera module 255 of FIGS. 2 to 5), and a remaining portion may be mapped to the surrounding area of the area corresponding to the image.

According to an embodiment, the second virtual object 830 may be one produced by changing the position, size, and/or information of at least one of a plurality of virtual elements included in the first virtual object 820.

According to an embodiment, the first virtual object 820 may be a 3D virtual object obtained based on a user input for enlarging a 2D third virtual object 810.

According to an embodiment, upon receiving a user input to enlarge the third virtual object 810, the wearable electronic device may increase the size of the third virtual object 810 while maintaining the shape of the third virtual object 810 and, if reaching a set size or more, change it into a first virtual object 820.

According to an embodiment, the first virtual object 820 may be one produced by changing the position, size, and/or information of at least one of a plurality of virtual elements included in the third virtual object 810.

According to an embodiment, upon receiving a user input for shrinking the first virtual object 820, the first virtual object 820 may be changed into a shrunken third virtual object 810.

According to an embodiment, upon receiving a user input to shrink the first virtual object 820, the wearable electronic device may decrease the size of the first virtual object 820 while maintaining the shape of the first virtual object 820 and, if reaching less than the set size, change it into a third virtual object 810.

According to an embodiment, upon receiving a user input for shrinking the second virtual object 830, the second virtual object 830 may be changed into a shrunken first virtual object 820.

According to an embodiment, upon receiving a user input to shrink the second virtual object 830, the wearable electronic device may decrease the size of the second virtual object 830 while maintaining the shape of the second virtual object 830 and, if reaching less than the set size, change it into a first virtual object 820.

According to an embodiment, the user's gesture input for shrinking the first virtual object may be a button touch for shrinking the first virtual object, a double touch, a triple touch, a long touch input on the first virtual object, or a pinch-in using a plurality of fingers of one hand, or a pinch-in using two hands, but is not limited thereto.

Figure 9A:
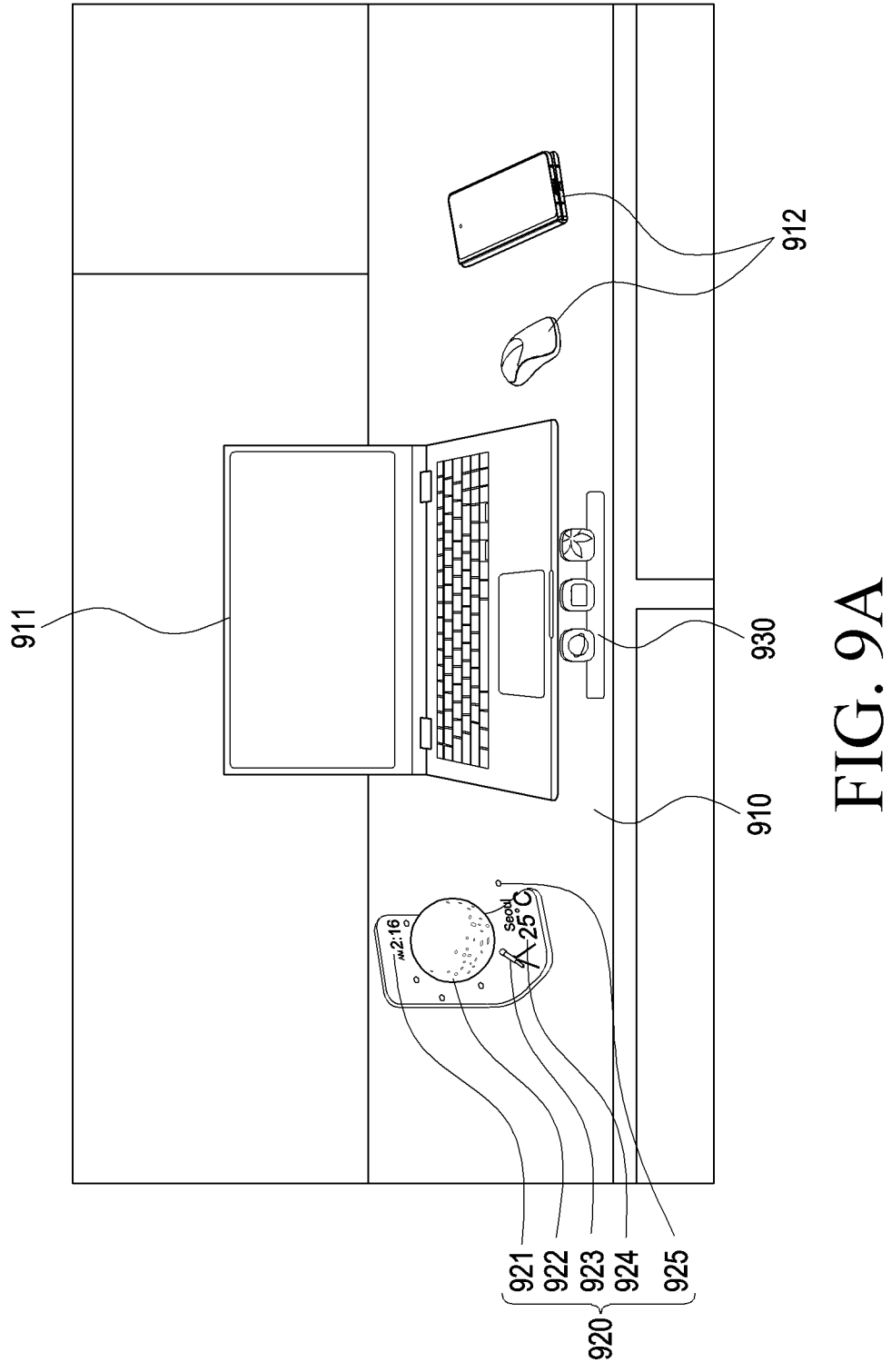
FIG. 9A is a view illustrating an operation of displaying a first virtual object on an image obtained through a camera by a wearable electronic device according to an embodiment of the disclosure.

FIG. 9A is a view illustrating an operation of displaying a first virtual object on an image obtained through a camera by a wearable electronic device according to an embodiment of the disclosure.

Referring to FIG. 9A, a wearable electronic device (e.g., the electronic device 101 of FIG. 1, the processor 120 of FIG. 1, the electronic device 200 of FIG. 2, or the electronic device 400 of FIG. 6) may display an image obtained through a camera (e.g., the camera module 180 of FIG. 1, the second camera module 253 of FIGS. 2 to 5, or the third camera module 255 of FIGS. 2 to 5) on a display (e.g., the display module 160 of FIG. 1, the display member 201 of FIGS. 2 to 5, or the display member 440 of FIG. 6).

According to an embodiment, the image obtained by the camera may include objects 910, 911, and 912 in the real space. For example, the image obtained by the camera may include an object 910 corresponding to a desk in the real space, an object 911 corresponding to a laptop computer in the real space, and an object 912 corresponding to a mount and a mobile device in the real space.

According to an embodiment, the wearable electronic device may display a first virtual object 920 in a partial area of the image obtained by the camera. According to an embodiment, the wearable electronic device may fix the first virtual object 920 based on the position, size, and/or type of the objects 910, 911, and 912 in the real space. According to an embodiment, the wearable electronic device may fix the first virtual object 920 based on a user input to dispose the first virtual object 920.

According to an embodiment, the first virtual object 920 may be a widget corresponding to a weather application.

According to an embodiment, the first virtual object 920 may include a first virtual element 921 related to time information (e.g., AM 2:16), a second virtual element 922 (e.g., moon-shaped 3D image) which is a first 2D/3D image, a third virtual element 923 (e.g., a telescope-shaped 3D image) which is a second 2D/3D image, a fourth virtual element 924 related to area and/or temperature information (e.g., Seoul, 25° C.), and/or a fifth virtual element 925 (e.g., at least one particle-shaped 3D image) which is at least one third 2D/3D image.

According to an embodiment, the wearable electronic device may further display at least one virtual object 930 other than the first virtual object 920. For example, the at least one virtual object 930 other than the first virtual object 920 may be a widget corresponding to the multi-interaction function (e.g., task bar or preferred application (e.g., hotseat)).

According to an embodiment, the wearable electronic device may enlarge the first virtual object 920 upon receiving a user input to enlarge the first virtual object 920.

Figure 9B:
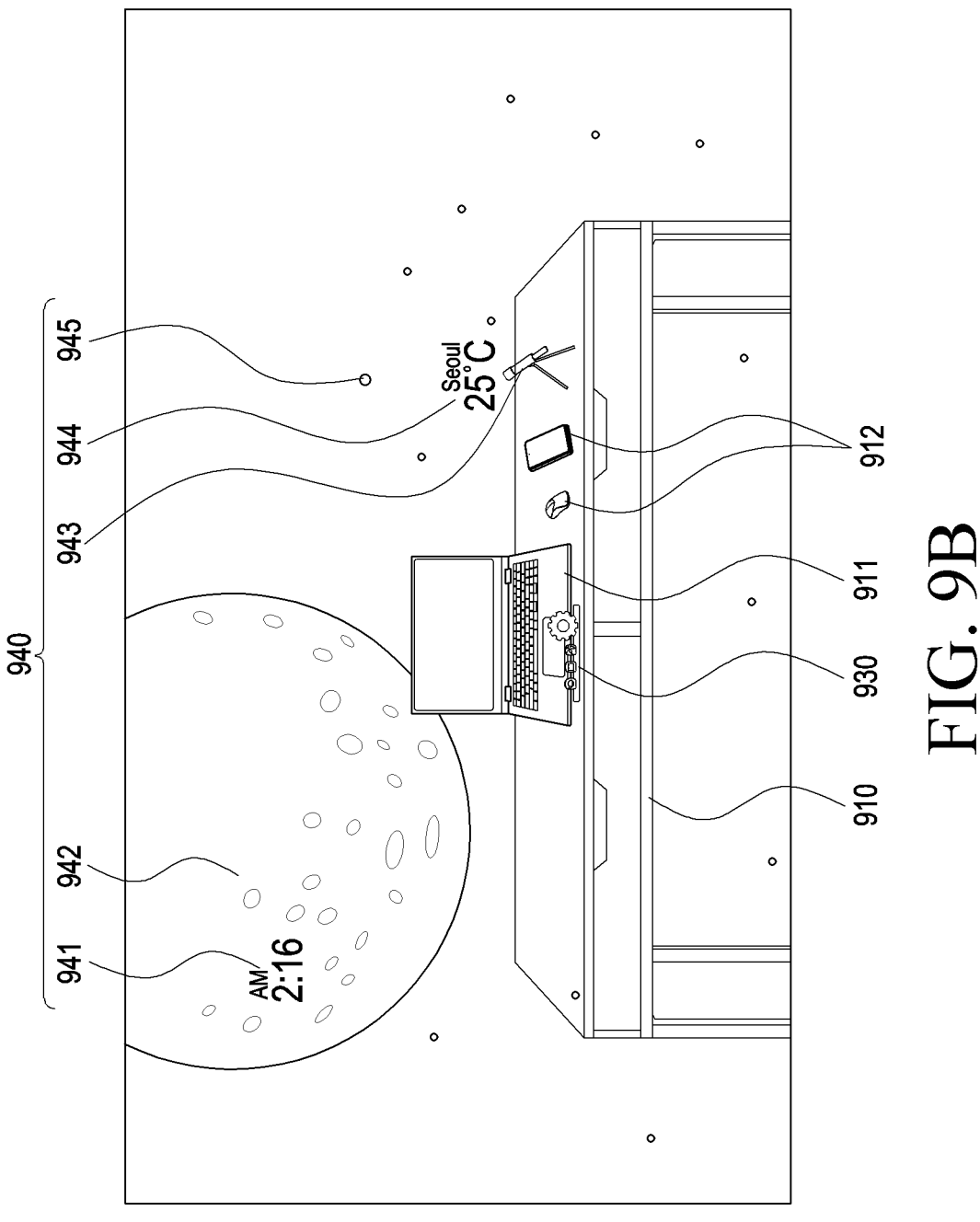
FIG. 9B is a view illustrating an operation of displaying an enlarged second virtual object on an image obtained through a camera by a wearable electronic device according to an embodiment of the disclosure.

According to an embodiment, if the size of the first virtual object 920 is a set size or more, the wearable electronic device may enlarge the first virtual object 920 and change the size, position, and/or information of at least one of the plurality of virtual elements 921, 922, 923, 924, and 925 included in the first virtual object 920 as shown in FIG. 9B.

FIG. 9B is a view illustrating an operation of displaying an enlarged second virtual object on an image obtained through a camera by a wearable electronic device according to an embodiment of the disclosure.

Referring to FIG. 9B, if a user input for enlarging the first virtual object 920 of FIG. 9A is received, and the size of the first virtual object 920 is a set size or more, the wearable electronic device may change the first virtual object into a second virtual object 940.

According to an embodiment, the wearable electronic device may display a second virtual object 940 in which at least one of the plurality of virtual elements included in the first virtual object has been rearranged, on the image.

According to an embodiment, the second virtual object 940 may be mapped to a 360-degree virtual space surrounding the position of the user wearing the wearable electronic device. According to an embodiment, the wearable electronic device may display a portion, corresponding to the image obtained by the camera, of the second virtual object 940 on the image.

According to an embodiment, at least one of the plurality of virtual elements 941, 942, 943, 944, and 945 included in the second virtual object 940 may be one produced by changing the size and/or information of at least one of the plurality of virtual elements included in the first virtual object.

According to an embodiment, at least one of the plurality of virtual elements included in the first virtual object may be rearranged based on at least one of the position or size of at least one object 910, 911, and 912 in the real space displayed on the image.

For example, the first virtual object (920 of FIG. 9A) placed over the desk object 910 in the real space may be enlarged into a size surrounding the desk object 910.

According to an embodiment, the first virtual element 941 related to time information (e.g., AM 2:16) may be one produced by enlarging the first virtual element 921 of FIG. 9A and changing 'AM 2:16' displayed in one line to be displayed in two lines. According to an embodiment, the first virtual element 921 disposed on the desk object 910 of FIG. 9A may be rearranged in an area spaced further apart from the desk object 910.

According to an embodiment, the second virtual element 942 (e.g., a moon-shaped 3D image) which is a first 2D/3D image may be enlarged over the second virtual element 922 of FIG. 9A and be rearranged in an area spaced further apart from the desk object 910.

According to an embodiment, the third virtual element 943 (e.g., a telescope-shaped 3D image) which is a second 2D/3D image may be enlarged over the third virtual element 923 of FIG. 9A, and be rearranged from the left side of the laptop computer object 911 to the right side of the laptop computer object 911 and the mount and mobile device object 912.

According to an embodiment, the fourth virtual element 944 related to area and/or temperature information (e.g., Seoul, 25° C.) may be enlarged over the fourth virtual element 924 of FIG. 9A, and be rearranged from the left side of the object 911 to the right side of the laptop computer object 911 and the mount and mobile device object 912, in an area spaced further apart from the desk object 910.

According to an embodiment, the fifth virtual element 945 which is at least one third 2D/3D image (e.g., at least one particle-shaped 3D image) may be enlarged over the fifth virtual element 925 of FIG. 9A and be rearranged in a broad area surrounding the desk object 910 and in which the third 2D/3D image interval is further increased.

According to an embodiment, the first virtual object 920 of FIG. 9A may be maintained although changed into the second virtual object 940.

Figure 10A:
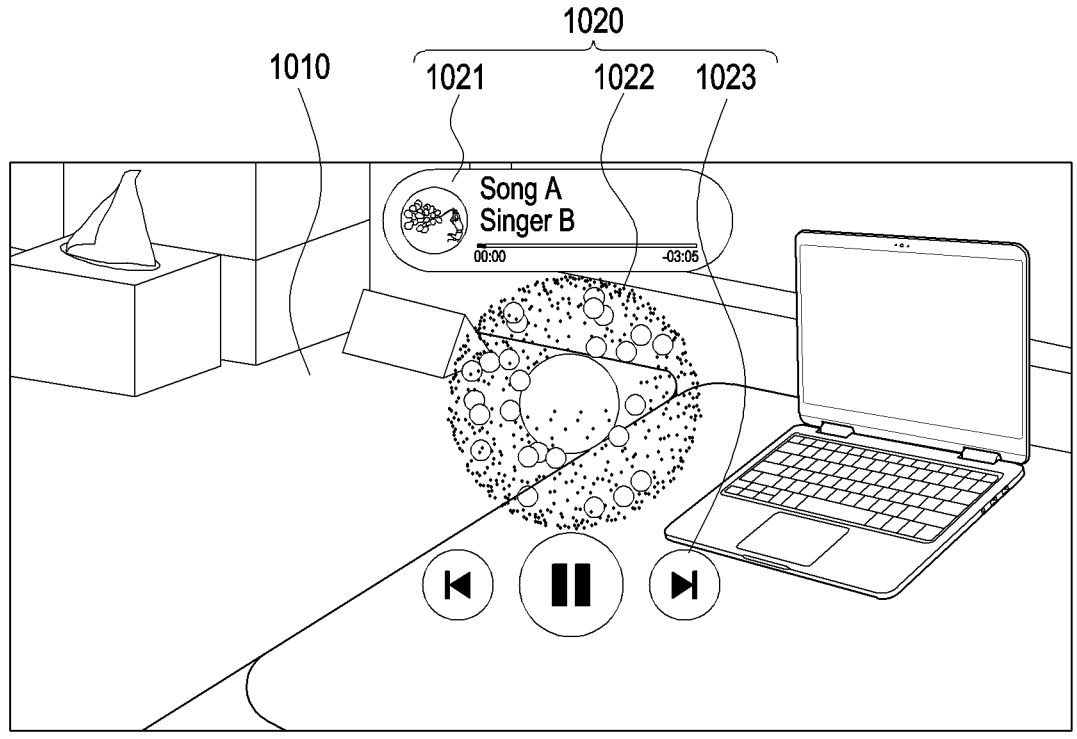
FIG. 10A is a view illustrating an operation of displaying a first virtual object on an image obtained through a camera by a wearable electronic device according to an embodiment of the disclosure.

FIG. 10A is a view illustrating an operation of displaying a first virtual object on an image obtained through a camera by a wearable electronic device according to an embodiment of the disclosure.

Referring to FIG. 10A, a wearable electronic device (e.g., the electronic device 101 of FIG. 1, the processor 120 of FIG. 1, the electronic device 200 of FIG. 2, or the electronic device 400 of FIG. 6) may display an image obtained through a camera (e.g., the camera module 180 of FIG. 1, the second camera module 253 of FIGS. 2 to 5, or the third camera module 255 of FIGS. 2 to 5) on a display (e.g., the display module 160 of FIG. 1, the display member 201 of FIGS. 2 to 5, or the display member 440 of FIG. 6).

According to an embodiment, the image obtained by the camera may include objects in the real space. For example, the image obtained by the camera may include an object 1010 corresponding to a desk in the real space and an object corresponding to a laptop computer in the real space.

According to an embodiment, the wearable electronic device may display a first virtual object 1020 in a partial area of the image obtained by the camera. According to an embodiment, the wearable electronic device may fix the first virtual object 1020 based on the position, size, and/or type of the object 910 in the real space. According to an embodiment, the wearable electronic device may fix the first virtual object 1020 based on a user input to dispose the first virtual object 1020.

According to an embodiment, the first virtual object 1020 may be a widget corresponding to a music player application.

According to an embodiment, the first virtual object 1020 may include a first virtual element 1021 to display information (e.g., song information or singer information) related to the playing music, a second virtual element 1022 which is a 2D/3D image (e.g., at least one particle-shaped 3D image), and/or a third virtual element 1023 which is a user interface (e.g., play, pause, previous song, or next song) for controlling the application.

According to an embodiment, the wearable electronic device may further display at least one virtual object other than the first virtual object 1020.

According to an embodiment, the wearable electronic device may enlarge the first virtual object 1020 upon receiving a user input to enlarge the first virtual object 1020.

Figure 10B:
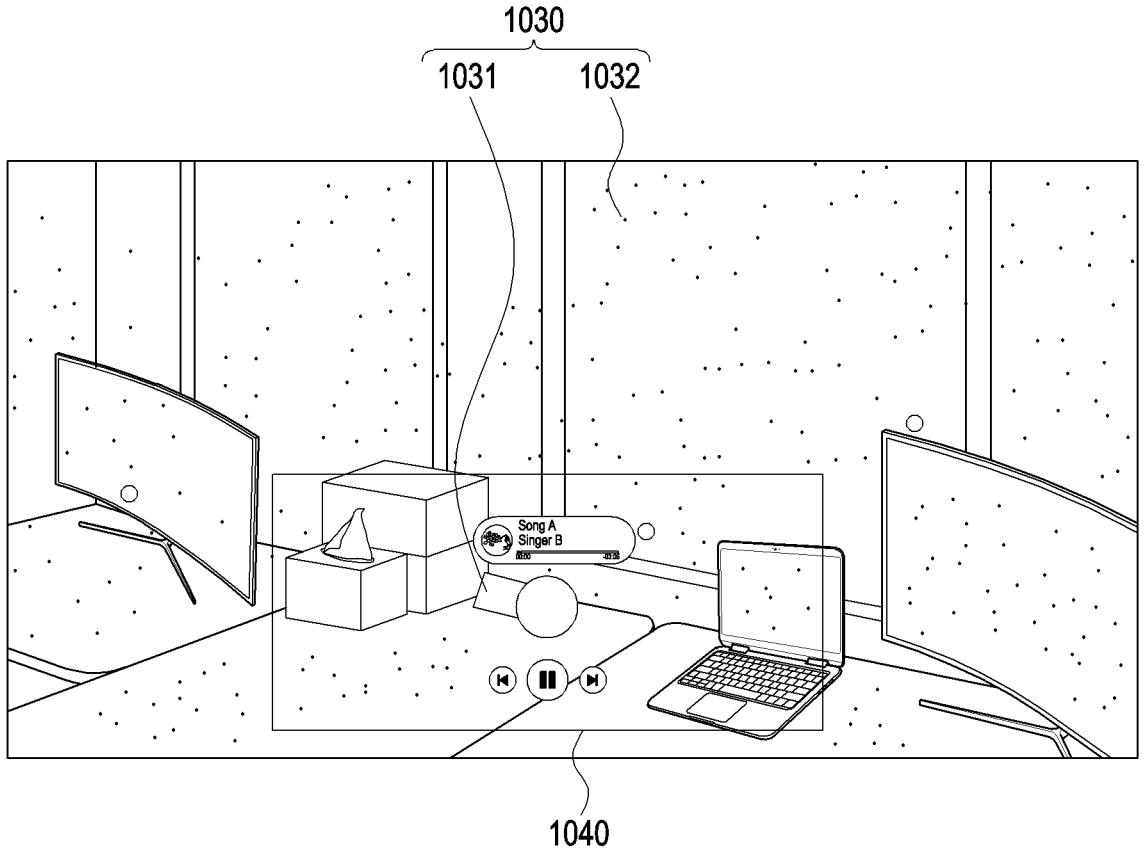
FIG. 10B is a view illustrating an operation of displaying an enlarged second virtual object on an image obtained through a camera by a wearable electronic device according to an embodiment of the disclosure.

According to an embodiment, if the size of the first virtual object 1020 is a set size or more, the wearable electronic device may enlarge the first virtual object 1020 and change the size, position, and/or information of at least one of the plurality of virtual elements 1021, 1022, and 1023 included in the first virtual object 1020 as shown in FIG. 10B.

According to an embodiment, the wearable electronic device may change the first virtual object 1020 into a second virtual object, which maintains the size and/or position of the third virtual element 1023 which is the user interface for controlling the application (e.g., music player application) corresponding to the first virtual object 1020, based on a user input.

FIG. 10B is a view illustrating an operation of displaying an enlarged second virtual object on an image obtained through a camera by a wearable electronic device according to an embodiment of the disclosure.

Referring to FIG. 10B, if a user input for enlarging the first virtual object 1020 of FIG. 10A is received, and the size of the first virtual object 1020 is a set size or more, the wearable electronic device may change the first virtual object into a second virtual object 1030.

According to an embodiment, at least one of the plurality of virtual elements included in the second virtual object 1030 may be one produced by changing the size and/or information of at least one of the plurality of virtual elements 1021, 1022, and 1023 included in the first virtual object 1020 of FIG. 10A.

According to an embodiment, the second virtual element 1022 which is the 2D/3D image (e.g., at least one particle-shaped 3D image) included in the first virtual object 1020 of FIG. 10A may be rearranged in a wide area surrounding the desk object (e.g., the object 1010 corresponding to the desk of FIG. 10A) and in which the interval between the 2D/3D image is increased on the second virtual object 1030.

According to an embodiment, the second virtual object 1030 may be mapped to a 360-degree virtual space surrounding the position of the user wearing the wearable electronic device. According to an embodiment, the wearable electronic device may map a portion 1031 corresponding to the image obtained by the camera of the second virtual object 1030 to the area 1040 corresponding to the image and map the rest 1032 to the surrounding area of the area corresponding to the image.

According to an embodiment, the wearable electronic device may display a portion 1031, corresponding to the image obtained by the camera, of the second virtual object 1030 on the image.

According to an embodiment, the wearable electronic device may display a portion 1031 of a second virtual object in which at least one of the plurality of virtual elements included in the first virtual object has been rearranged, on the image.

According to an embodiment, a user interface for controlling the application corresponding to the second virtual object 1030 may be included in the portion 1031 of the second virtual object displayed on the image.

Figure 10C:
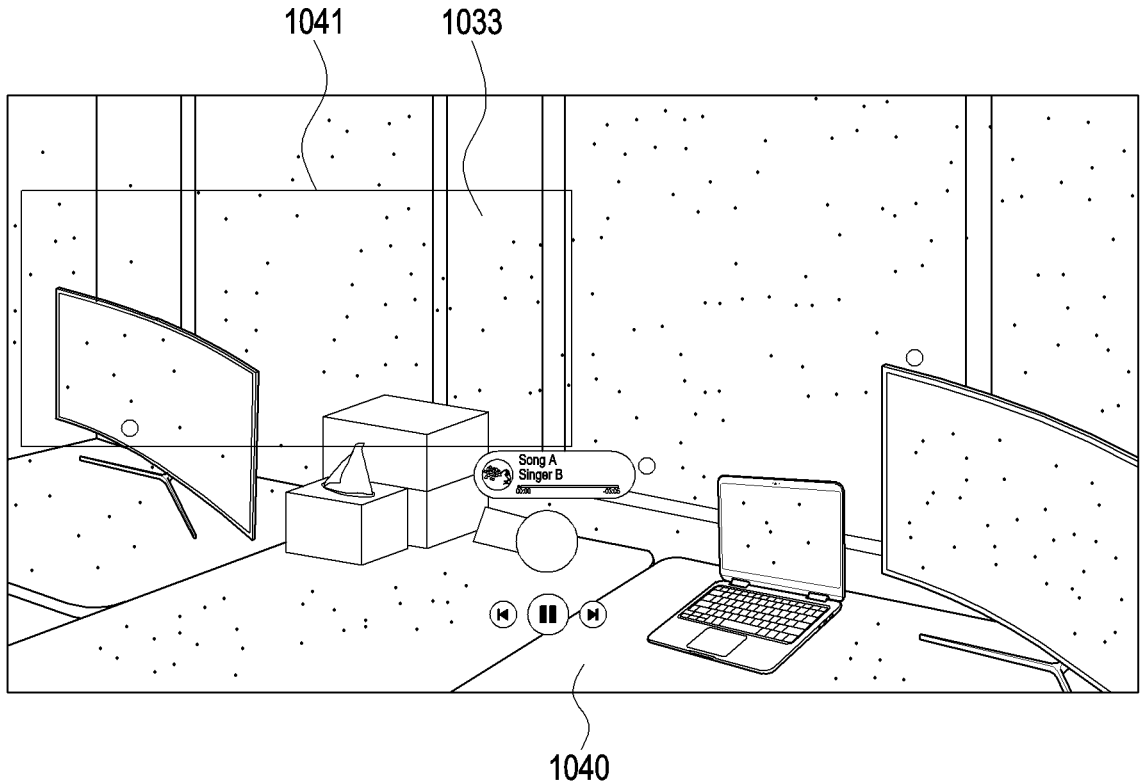
FIG. 10C is a view illustrating an operation of displaying a portion different from a portion of the second virtual object shown in FIG. 10B, based on a movement of a user's field of view by a wearable electronic device according to an embodiment of the disclosure.

FIG. 10C is a view illustrating an operation of displaying a portion different from a portion of the second virtual object shown in FIG. 10B, based on a movement of a user's field of view by a wearable electronic device according to an embodiment of the disclosure.

Referring to FIG. 10C, the wearable electronic device may display another portion 1033 of the second virtual object based on a change in the image obtained by the camera due to a movement of the wearable electronic device.

According to an embodiment, the wearable electronic device may display a portion 1033 of the second virtual object mapped to the area 1041 corresponding to the image obtained by the camera, changed by the movement of the wearable electronic device, of the portion 1032 of the second virtual object mapped to the surrounding area in FIG. 10B.

According to an embodiment, the user interface for controlling the application corresponding to the second virtual object may not be included in the portion 1033 of the second virtual object displayed on the changed image.

Figure 11A:
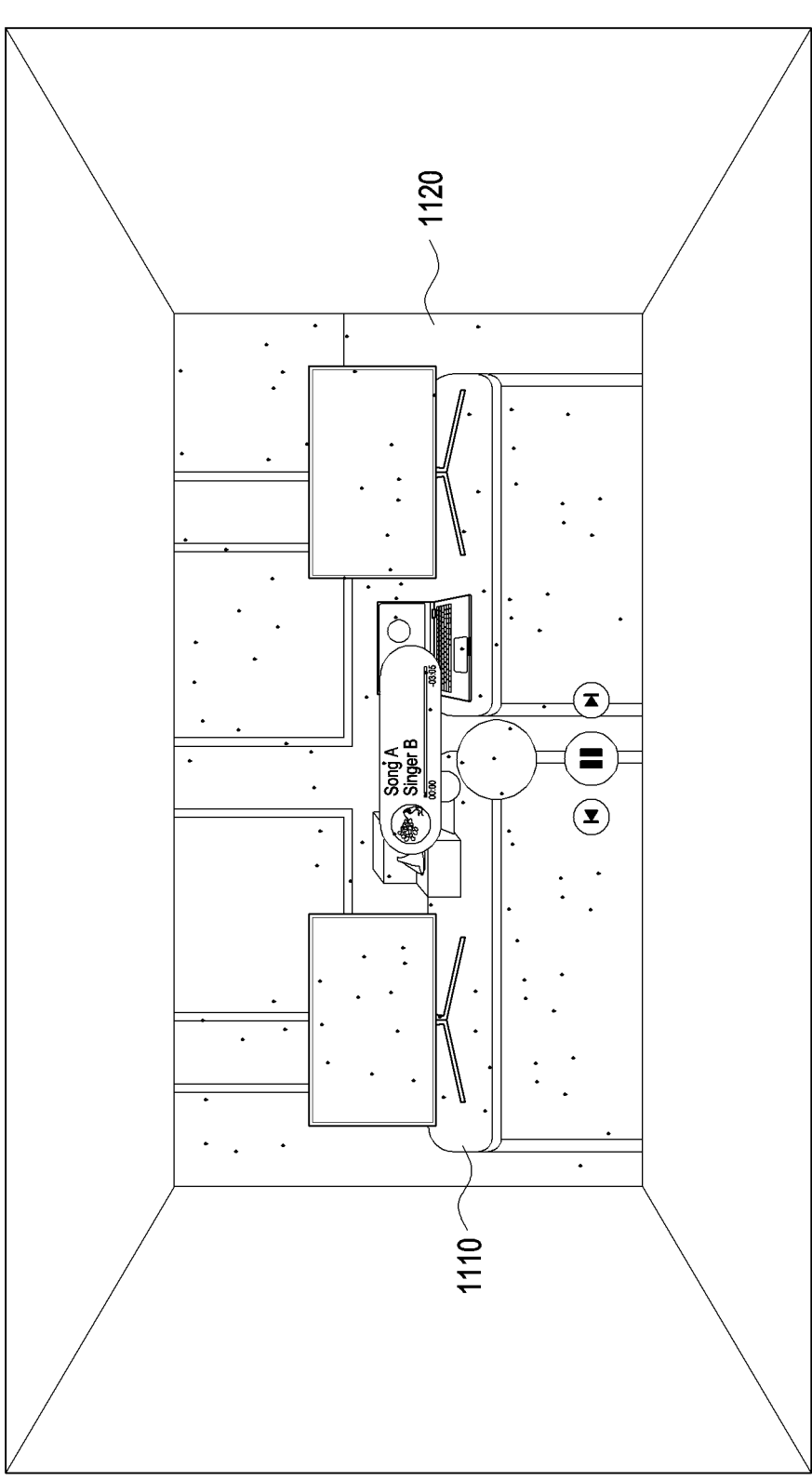
FIG. 11A is a view illustrating an operation of displaying an entire second virtual object based on a user's movement by a wearable electronic device according to an embodiment of the disclosure.

FIG. 11A is a view illustrating an operation of displaying an entire second virtual object based on a user's movement by a wearable electronic device according to an embodiment of the disclosure.

Referring to FIG. 11A, the wearable electronic device (e.g., the electronic device 101 of FIG. 1, the processor 120 of FIG. 1, the electronic device 200 of FIG. 2, or the electronic device 400 of FIG. 6) may fix a second virtual object 1120 (e.g., the second virtual object 1030 of FIG. 10B) in the virtual space.

According to an embodiment, the wearable electronic device may display a second virtual object 1120 shaped to surround a desk object 1110 based on a user input to enlarge a first virtual object (e.g., the first virtual object 1020 of FIG. 10A) placed on the desk object 1110 (e.g., the object 1010 corresponding to the desk of FIG. 10A).

According to an embodiment, in the case of FIG. 10B, as the wearable electronic device is positioned close to the desk object 1110, the wearable electronic device may also be surrounded by the second virtual object 1120 fixed in the virtual space around the desk object 1110. Thus, although the user turns her head or relocates, the wearable electronic device may display a portion of the second virtual object 1120.

According to an embodiment, the entire second virtual object 1120 may be displayed on the changed image based on the change in the image obtained by the camera (e.g., the camera module 180 of FIG. 1, the second camera module 253 of FIGS. 2 to 5, or the third camera module 255 of FIGS. 2 to 5) by the relocation of the wearable electronic device.

According to an embodiment, in the case of FIG. 11A, the wearable electronic device may display the entire second virtual object 1120 based on movement of the wearable electronic device away from the desk object 1110. For example, if the wearable electronic device moves away from the desk object 1110 surrounded by the second virtual object 1120 enough to escape from the border of the second virtual object 1120, the wearable electronic device may display the entire second virtual object 1120, rather than the wearable electronic device being surrounded by the second virtual object 1120.

Figure 11B:
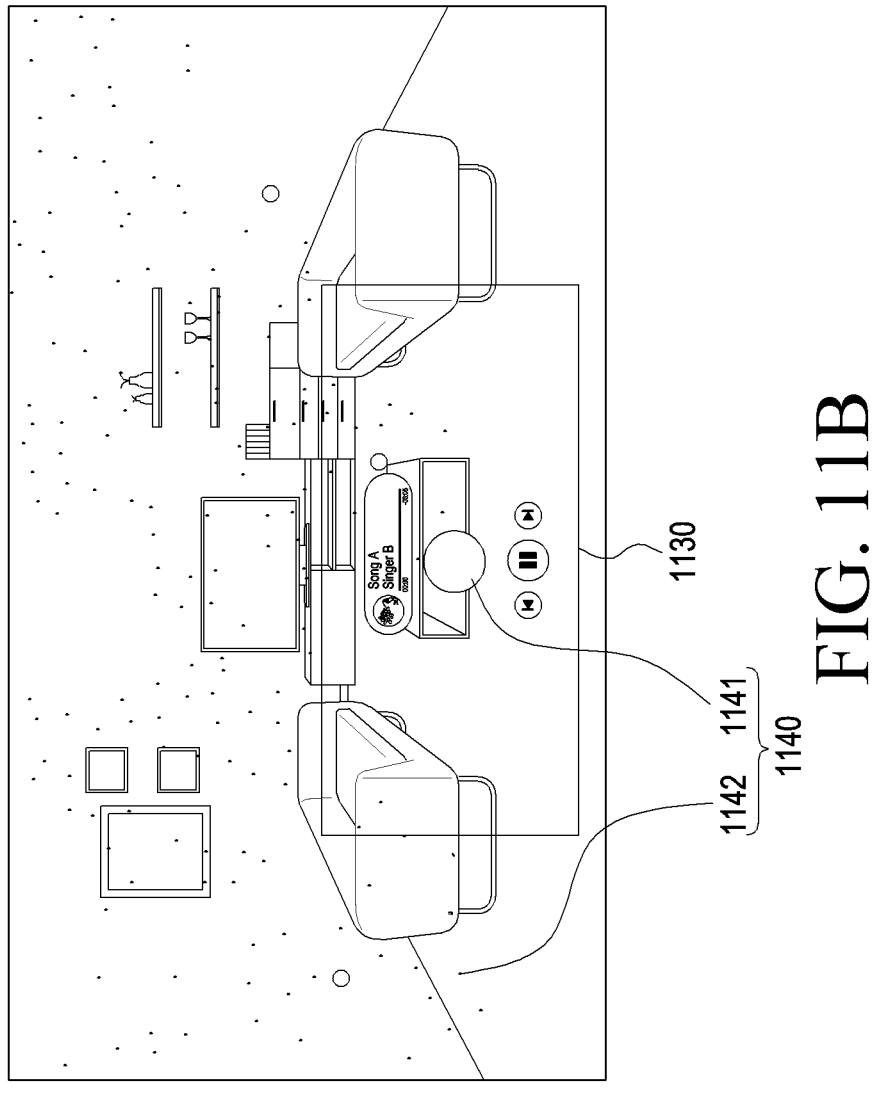
FIG. 11B is a view illustrating an embodiment in which an area where a second virtual object is displayed is maintained based on a user's movement by a wearable electronic device according to an embodiment of the disclosure.

FIG. 11B is a view illustrating an embodiment in which an area where a second virtual object is displayed is maintained based on a user's movement by a wearable electronic device according to an embodiment of the disclosure.

Referring to FIG. 11B, the wearable electronic device (e.g., the electronic device 101 of FIG. 1, the processor 120 of FIG. 1, the electronic device 200 of FIG. 2, or the electronic device 400 of FIG. 6) may fix a second virtual object 1140 (e.g., the second virtual object 1030 of FIG. 10B) to the user wearing the wearable electronic device. According to an embodiment, the second virtual object 1140 may be fixed to the wearable electronic device.

According to an embodiment, the wearable electronic device may map a portion 1141 corresponding to the image obtained by the camera of the second virtual object 1140 to the area 1130 corresponding to the image and map the rest 1142 to the surrounding area of the area corresponding to the image.

According to an embodiment, the wearable electronic device may keep displaying a portion 1141 of the second virtual object 1140 based on a change in the image obtained by the camera due to a movement (e.g., rotation and/or relocation) of the wearable electronic device caused by the user's movement. For example, although the image obtained by the camera is changed from the bedroom image to the living room image as the user moves from the bedroom to living room, the wearable electronic device may keep displaying the portion 1141 of the second virtual object 1140.

Figure 12A:
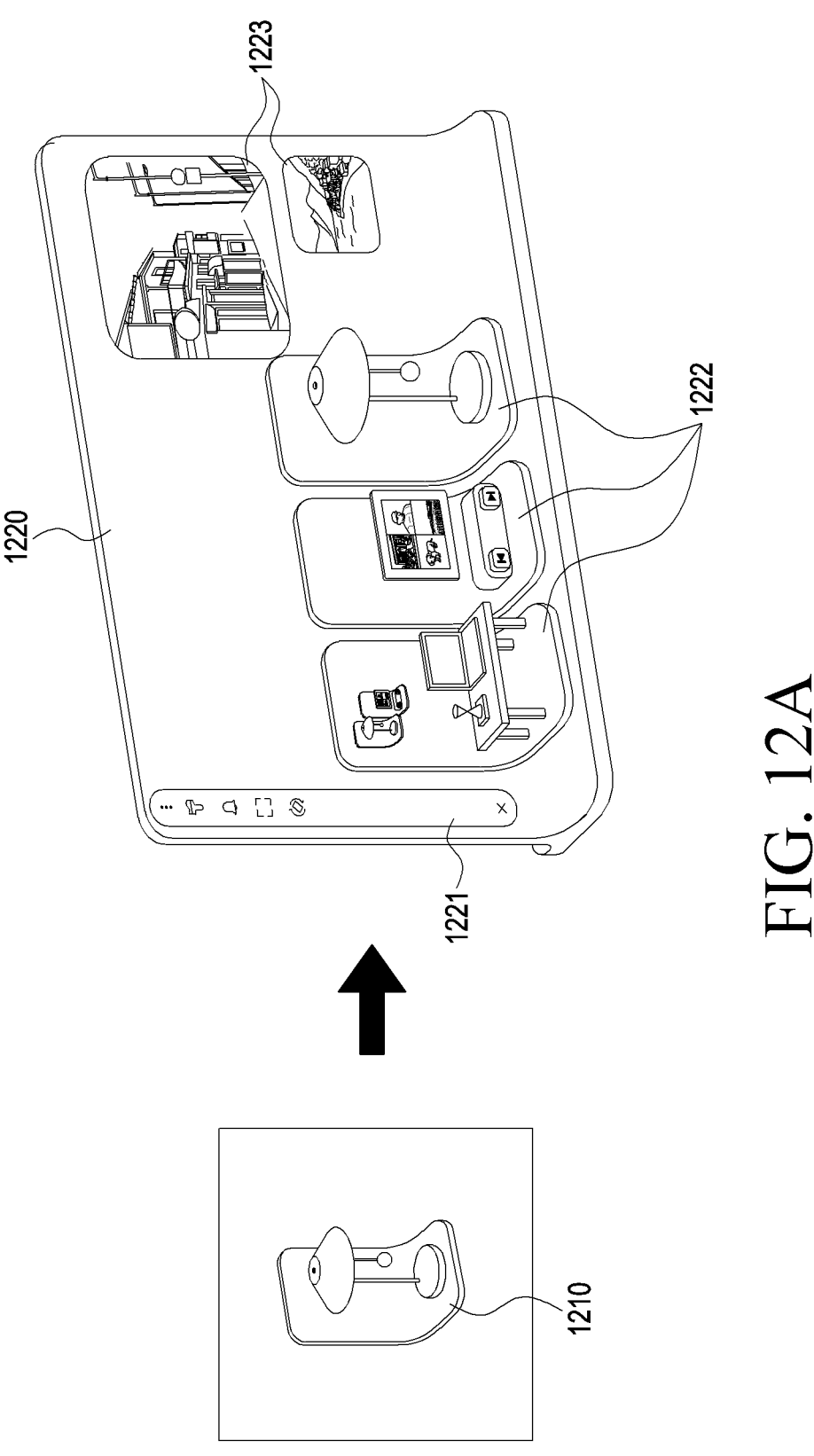
FIG. 12A is a view illustrating an operation of displaying a second virtual object further including a board-shaped virtual element based on a user input by a wearable electronic device according to an embodiment of the disclosure.

FIG. 12A is a view illustrating an operation of displaying a second virtual object further including a board-shaped virtual element based on a user input by a wearable electronic device according to an embodiment of the disclosure.

Referring to FIG. 12A, upon receiving a user input to enlarge a first virtual object 1210, the wearable electronic device (e.g., the electronic device 101 of FIG. 1, the processor 120 of FIG. 1, the electronic device 200 of FIG. 2, or the electronic device 400 of FIG. 6) may change it into a second virtual object 1120 that further includes a board-shaped object that may attach other virtual objects 1221, 1222, and 1223.

According to an embodiment, the first virtual object 1210 may be a 2D or 3D widget corresponding to a first application (e.g., a flashlight application).

According to an embodiment, the board included in the second virtual object 1220 may include a first 2D/3D widget 1221 related to the multi-interaction function, a 2D/3D widget 1222 corresponding to an application different from the first application, and/or a 2D widget 1223 related to a note, photo, and/or sticker.

According to an embodiment, the widgets 1221, 1222, and 1223 attached to the board included in the second virtual object 1220 may be attached/detached.

Figure 12B:
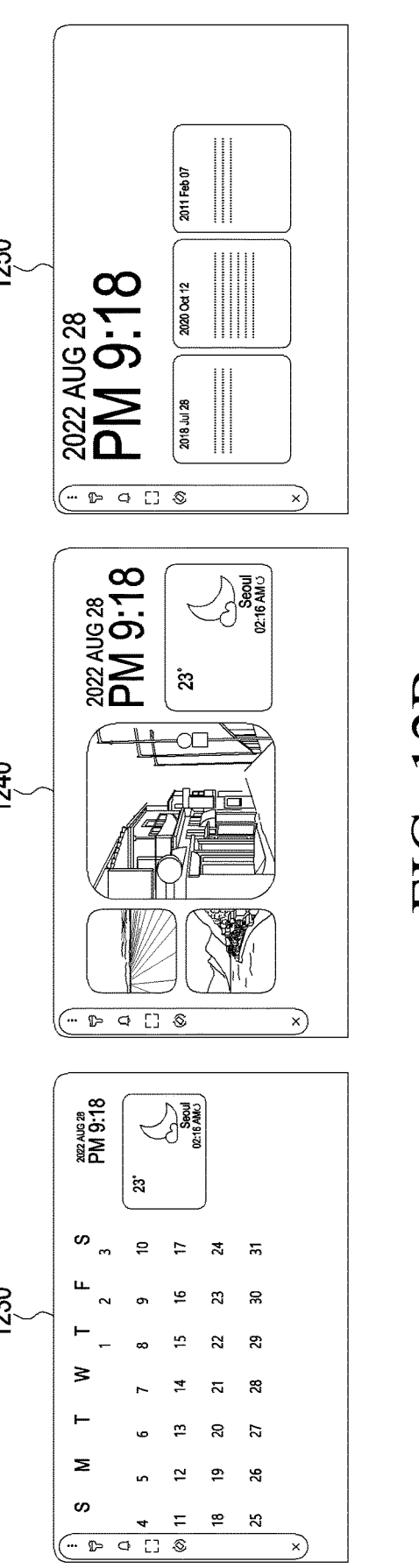
FIG. 12B is a view illustrating various embodiments of a board-shaped virtual element.

According to an embodiment, the second virtual object 1220 may be created in various shapes as shown in FIG. 12B according to a user input.

FIG. 12B is a view illustrating various embodiments of a board-shaped virtual element.

FIG. 12B is a view illustrating various embodiments of a board-shaped virtual Referring to FIG. 12B, the wearable electronic device may adjust the type, position, and/or size of the virtual element included in the second virtual object by a user input. According to an embodiment, the virtual element may be a widget corresponding to an application.

According to an embodiment, a first example 1230 of the second virtual object may include a widget of a calendar application, a widget of a clock application, a widget of a weather application, and/or one or more stickers.

According to an embodiment, a second example 1240 of the second virtual object may include one or more photo widgets, a widget of a clock application, and/or a widget of a weather application.

According to an embodiment, the widget of the clock application and/or the widget of the weather application included in the first example 1230 of the second virtual object may differ in position and/or size from the widget of the clock application and/or the widget of the weather application included in the second example 1240 of the second virtual object.

According to an embodiment, a third example 1250 of the second virtual object may include one or more note widgets and/or a widget of a clock application.

According to an embodiment, the widget of the clock application included in the third example 1250 of the second virtual object may differ in position and/or size from the widget of the clock application included in the first example 1230 and the second example 1240.

According to an embodiment, a wearable electronic device (e.g., the electronic device 101 of FIG. 1, the electronic device 200 of FIG. 2, or the electronic device 400 of FIG. 6) may comprise a display (e.g., the display module 160 of FIG. 1, the display member 201 of FIGS. 2 to 5, or the display member 440 of FIG. 6), a camera (e.g., the camera module 180 of FIG. 1, the second camera module 253 of FIGS. 2 to 5, or the third camera module 255 of FIGS. 2 to 5), and at least one processor (e.g., the processor 120 of FIG. 1) operatively connected with the display and the camera.

According to an embodiment, the at least one processor may display an image obtained by the camera on the display.

According to an embodiment, the at least one processor may display a first virtual object (e.g., the first virtual object 820 of FIG. 8, the first virtual object 920 of FIG. 9A, or the first virtual object 1020 of FIG. 10A) in a partial area of the image.

According to an embodiment, the at least one processor may change the first virtual object into an enlarged second virtual object (e.g., the second virtual object 830 of FIG. 8, the second virtual object 940 of FIG. 9B, or the second virtual object 1030 of FIG. 10B) based on receiving a user input to enlarge the first virtual object through the camera.

According to an embodiment, the at least one processor may, based on a size of the second virtual object exceeding a set value, map a portion (e.g., the portion 1031 of the second virtual object of FIG. 10B) of the second virtual object to an area (e.g., the area 1040 corresponding to the image of FIG. 10B) corresponding to the image.

According to an embodiment, the at least one processor may map a rest (e.g., the rest 1032 except for the portion of the second virtual object of FIG. 10B) except for the portion of the second virtual object to a surrounding area of the area.

According to an embodiment, the at least one processor may display a portion of the second virtual object on the image.

According to an embodiment, the at least one processor may display, on the image, the second virtual object in which at least one of a plurality of virtual elements (e.g., the plurality of virtual elements 921, 922, 923, 924, and 925 of FIG. 9A, or the plurality of virtual elements 1021, 1022, and 1023 of FIG. 10A) included in the first virtual object is rearranged.

According to an embodiment, at least one of the plurality of virtual elements (e.g., the plurality of virtual elements 941, 942, 943, 944, and 945 of FIG. 9B) included in the second virtual object may be one produced by changing a size and/or information of at least one of the plurality of virtual elements included in the first virtual object.

According to an embodiment, the at least one processor may rearrange at least one of the plurality of virtual elements included in the first virtual object, based on at least one of a position or size of at least one object (e.g., the objects 910, 911, and 912 in the real space of FIG. 9A or the object 1010 in the real space of FIG. 10A) in a real space displayed on the image.

According to an embodiment, the first virtual object and the second virtual object may include at least one user interface (e.g., the user interface 1023 of FIG. 10A) for controlling an application corresponding to the first virtual object and the second virtual object.

According to an embodiment, the at least one processor may change the first virtual object into the second virtual object which maintains a size and/or position of the at least one user interface included in the first virtual object.

According to an embodiment, the surrounding area of the area may be a 360-degree virtual space surrounding a position of a user wearing the wearable electronic device.

According to an embodiment, the at least one processor may display another portion (e.g., another portion 1033 of the second virtual object of FIG. 10C) of the second virtual object, based on a change in the image obtained by the camera due to a movement of the wearable electronic device.

According to an embodiment, the second virtual object may be fixed in a virtual space.

According to an embodiment, the at least one processor may display a whole (e.g., the second virtual object 1120 of FIG. 11A) of the second virtual object on the changed image, based on the change in the image obtained by the camera due to a relocation of the wearable electronic device.

According to an embodiment, the second virtual object may be fixed to a user wearing the wearable electronic device.

According to an embodiment, the at least one processor may keep displaying the portion of the second virtual object, based on the change in the image obtained by the camera due to the relocation of the wearable electronic device.

According to an embodiment, the first virtual object may be a 3D virtual object obtained based on a user input for enlarging a 2D third virtual object (e.g., the third virtual object 810 of FIG. 8).

According to an embodiment, the at least one processor may change into a second virtual object (e.g., the second virtual object 1220 of FIG. 12A, the first example 1230 of the second virtual object of FIG. 12B, the second example 1240 of the second virtual object of FIG. 12B, or the third example 1250 of the second virtual object of FIG. 12B) further including a board-shaped virtual element capable of attaching/detaching another virtual object, based on the user input.

According to an embodiment, a method for controlling a wearable electronic device may comprise displaying an image obtained by a camera on a display.

According to an embodiment, the method for controlling the wearable electronic device may comprise displaying a first virtual object in a partial area of the image.

According to an embodiment, the method for controlling the wearable electronic device may comprise changing the first virtual object into an enlarged second virtual object based on receiving a user input to enlarge the first virtual object through the camera.

According to an embodiment, the method for controlling the wearable electronic device may comprise, based on a size of the second virtual object exceeding a set value, mapping a portion of the second virtual object to an area corresponding to the image.

According to an embodiment, the method for controlling the wearable electronic device may comprise mapping a rest except for the portion of the second virtual object to a surrounding area of the area and displaying a portion of the second virtual object on the image.

According to an embodiment, displaying the portion of the second virtual object on the image may include displaying, on the image, the second virtual object in which at least one of a plurality of virtual elements included in the first virtual object is rearranged.

According to an embodiment, at least one of the plurality of virtual elements included in the second virtual object may be one produced by changing a size and/or information of at least one of the plurality of virtual elements included in the first virtual object.

According to an embodiment, changing into the second virtual object may rearrange at least one of the plurality of virtual elements included in the first virtual object, based on at least one of a position or size of at least one object in a real space displayed on the image.

According to an embodiment, the first virtual object and the second virtual object may include at least one user interface for controlling an application corresponding to the first virtual object and the second virtual object.

According to an embodiment, changing into the second virtual object may change the first virtual object into the second virtual object which maintains a size and/or position of the at least one user interface included in the first virtual object.

According to an embodiment, the surrounding area of the area may be a 360-degree virtual space surrounding a position of a user wearing the wearable electronic device.

According to an embodiment, the method for controlling the wearable electronic device may further comprise displaying another portion of the second virtual object, based on a change in the image obtained by the camera due to a movement of the wearable electronic device.

According to an embodiment, the second virtual object may be fixed in a virtual space.

According to an embodiment, the method for controlling the wearable electronic device may further comprise displaying a whole of the second virtual object on the changed image, based on the change in the image obtained by the camera due to a relocation of the wearable electronic device.

According to an embodiment, the second virtual object may be fixed to a user wearing the wearable electronic device.

According to an embodiment, the method for controlling the wearable electronic device may further comprise keeping displaying the portion of the second virtual object, based on the change in the image obtained by the camera due to the relocation of the wearable electronic device.

According to an embodiment, the first virtual object may be a 3D virtual object obtained based on a user input to enlarge a 2D third virtual object.

According to an embodiment, the method for controlling the wearable electronic device may further comprise changing into a second virtual object further including a board-shaped virtual element capable of attaching/detaching another virtual object, based on the user input.

According to an embodiment, in a non-transitory computer-readable recording medium storing one or more programs, the one or more programs may include instructions that enable a wearable electronic device to display an image obtained by a camera on a display.

According to an embodiment, the one or more programs may include instructions that enable the wearable electronic device to display a first virtual object in a partial area of the image.

According to an embodiment, the one or more programs may include instructions that enable the wearable electronic device to change the first virtual object into an enlarged second virtual object based on receiving a user input to enlarge the first virtual object through the camera.

According to an embodiment, the one or more programs may include instructions that enable the wearable electronic device to, based on a size of the second virtual object exceeding a set value, map a portion of the second virtual object to an area corresponding to the image.

According to an embodiment, the one or more programs may include instructions that enable the wearable electronic device to map a rest except for the portion of the second virtual object to a surrounding area of the area and displaying a portion of the second virtual object on the image.

According to an embodiment, the one or more programs may include instructions that enable the wearable electronic device to display, on the image, the second virtual object in which at least one of a plurality of virtual elements included in the first virtual object is rearranged.

According to an embodiment, at least one of the plurality of virtual elements included in the second virtual object may be one produced by changing a size and/or information of at least one of the plurality of virtual elements included in the first virtual object.

According to an embodiment, the one or more programs may include instructions that enable the wearable electronic device to rearrange at least one of the plurality of virtual elements included in the first virtual object, based on at least one of a position or size of at least one object in a real space displayed on the image.

According to an embodiment, the first virtual object and the second virtual object may include at least one user interface for controlling an application corresponding to the first virtual object and the second virtual object.

According to an embodiment, the one or more programs may include instructions that enable the wearable electronic device to change the first virtual object into the second virtual object which maintains a size and/or position of the at least one user interface included in the first virtual object.

According to an embodiment, the surrounding area of the area may be a 360-degree virtual space surrounding a position of a user wearing the wearable electronic device.

According to an embodiment, the one or more programs may include instructions that enable the wearable electronic device to display another portion of the second virtual object, based on a change in the image obtained by the camera due to a movement of the wearable electronic device.

According to an embodiment, the second virtual object may be fixed in a virtual space.

According to an embodiment, the one or more programs may include instructions that enable the wearable electronic device to display a whole of the second virtual object on the changed image, based on the change in the image obtained by the camera due to a relocation of the wearable electronic device.

According to an embodiment, the second virtual object may be fixed to a user wearing the wearable electronic device.

According to an embodiment, the one or more programs may include instructions that enable the wearable electronic device to keep displaying the portion of the second virtual object, based on the change in the image obtained by the camera due to the relocation of the wearable electronic device.

According to an embodiment, the first virtual object may be a 3D virtual object obtained based on a user input to enlarge a 2D third virtual object.

According to an embodiment, the one or more programs may include instructions that enable the wearable electronic device to change into a second virtual object further including a board-shaped virtual element capable of attaching/detaching another virtual object, based on the user input.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device comprising:

at least one display;

at least one camera;

at least one processor; and memory storing one or more computer programs, wherein the one or more computer programs include computer-executable instructions that, when executed by the at least one processor individually or collectively, cause the wearable electronic device to:

provide, using the at least one display, a first image obtained by the at least one camera, provide, using the at least one display, a first virtual object in a partial area of the first image, based on receiving a user input to enlarge the first virtual object, increase a size of the first virtual object, wherein the first virtual object includes a plurality of virtual elements, based on the increased size of the first virtual object being less than a set value as a result of increasing the size of the first virtual object, maintain a shape of the first virtual object while the size of the first virtual object is being increased, based on the increased size of the first virtual object reaching the set value as the result of increasing the size of the first virtual object, change the first virtual object into a second virtual object by rearranging a display location of the plurality of virtual elements to be spaced apart from each other in 3D space, and provide, using the at least one display, at least one of the plurality of virtual elements in a first area that corresponds to the first image being displayed and the other virtual elements of the plurality of virtual elements, excluding the at least one of the plurality of virtual elements, in a surrounding area except the first area, wherein the surrounding area is a 360-degree virtual space surrounding a position of a user wearing the wearable electronic device.

2. The wearable electronic device of claim 1, wherein the instructions, when executed by the at least one processor individually or collectively, cause the wearable electronic device to:

display, on the first image, the second virtual object such that the at least one of the plurality of virtual elements included in the first virtual object is rearranged in the second virtual object, and wherein at least one of the plurality of virtual elements included in the second virtual object is obtained by changing a size and/or information of the at least one of the plurality of virtual elements included in the first virtual object.

3. The wearable electronic device of claim 2, wherein the instructions, when executed by the at least one processor individually or collectively, cause the wearable electronic device to:

rearrange the at least one of the plurality of virtual elements included in the first virtual object, based on at least one of a position or size of at least one object in a real space displayed on the first image.

4. The wearable electronic device of claim 2, wherein first virtual object and the second virtual object include at least one user interface for controlling an application corresponding to the first virtual object and the second virtual object, and wherein the instructions, when executed by the at least one processor individually or collectively, cause the wearable electronic device to change the first virtual object into the second virtual object while maintaining a size and/or position of the at least one user interface between the first virtual object and the second virtual object.

5. The wearable electronic device of claim 1, wherein the instructions, when executed by the at least one processor individually or collectively, cause the wearable electronic device to display at least one of the other virtual elements on a second image obtained by the at least one camera, the second image being different from the first image based on a movement of the wearable electronic device.

6. The wearable electronic device of claim 1, wherein the second virtual object is fixed in a virtual space, and wherein the instructions, when executed by the at least one processor individually or collectively, cause the wearable electronic device to display a whole of the second virtual object on the at least one of the plurality of virtual elements in the first area with a third image obtained by the at least one camera, the third image being different from the first image based on a relocation of the wearable electronic device.

7. The wearable electronic device of claim 1, wherein the second virtual object is fixed to a user wearing the wearable electronic device, and wherein the instructions, when executed by the at least one processor individually or collectively, cause the wearable electronic device to continue to display at least one of the plurality of virtual elements in a second area that corresponds to a fourth image obtained by the at least one camera and at least one of the other virtual elements in the surrounding area except the second area, the fourth image being different from the first image based on a relocation of the wearable electronic device.

8. The wearable electronic device of claim 1, wherein the first virtual object is a 3D virtual object obtained based on a user input to enlarge a 2D third virtual object.

9. The wearable electronic device of claim 1, wherein the second virtual object further includes a board-shaped virtual element configured to attach/detach another virtual object.

10. A method for controlling a wearable electronic device that includes at least one camera and at least one display, the method comprising:

providing, using the at least one display, a first image obtained by the at least one camera;

providing, using the at least one display, a first virtual object in a partial area of the first image;

based on receiving a user input to enlarge the first virtual object, increasing a size of the first virtual object, wherein the first virtual object includes a plurality of virtual elements;

based on the increased size of the first virtual object being less than a set value as a result of increasing the size of the first virtual object, maintaining a shape of the first virtual object while the size of the first virtual object is being increased;

based on the increased size of the first virtual object reaching the set value as the result of increasing the size of the first virtual object, changing the first virtual object into a second virtual object by rearranging a display location of the plurality of virtual elements to be spaced apart from each other in 3D space; and providing, using the at least one display, at least one of the plurality of virtual elements in a first area that corresponds to the first image being displayed and the other virtual elements of the plurality of virtual elements, excluding the at least one of the plurality of virtual elements, in a surrounding area except the first area, wherein the surrounding area is a 360-degree virtual space surrounding a position of a user wearing the wearable electronic device.

11. The method of claim 10, wherein the providing of the part of the second virtual object includes displaying, on the first image, the second virtual object such that the at least one of the plurality of virtual elements included in the first virtual object is rearranged in the second virtual object, and wherein at least one of the plurality of virtual elements included in the second virtual object is obtained by changing a size and/or information of the at least one of the plurality of virtual elements included in the first virtual object.

12. The method of claim 11, wherein the changing of the first virtual object into the second virtual object comprises rearranging the at least one of the plurality of virtual elements included in the first virtual object, based on at least one of a position or size of at least one object in a real space displayed on the first image.

13. The method of claim 11, wherein the first virtual object and the second virtual object include at least one user interface for controlling an application corresponding to the first virtual object and the second virtual object, and wherein the enlarging of the first virtual object comprises enlarging the first virtual object while maintaining a size and/or position of the at least one user interface between the first virtual object and the second virtual object.

14. The method of claim 10, further comprising displaying at least one of the other virtual elements on a second image obtained by the at least one camera, the second image being different from the first image based on a movement of the wearable electronic device.

15. The method of claim 10, wherein the second virtual object is fixed in a virtual space, and wherein the method further comprises displaying the at least one of the plurality of virtual elements in the first area with a third the image obtained by the at least one camera, the third image being different from the first image based on a relocation of the wearable electronic device.

16. The method of claim 10, wherein the second virtual object is fixed to a user wearing the wearable electronic device, and wherein the method further comprises continuing to display at least one of the plurality of virtual elements in a second area that corresponds to a fourth image obtained by the at least one camera and at least one of the other virtual elements in the surrounding area except the second area, the fourth image being different from the first image based on a relocation of the wearable electronic device.

17. The method of claim 10, wherein the first virtual object is a 3D virtual object obtained based on a user input to enlarge a 2D third virtual object.

18. One or more non-transitory computer-readable storage media storing one or more computer programs including computer-executable instructions that, when executed by one or more processors of a wearable device individually or collectively, cause the wearable device to perform operations, the operations comprising:

providing, using at least one display, an image obtained by at least one camera;

providing, using the at least one display, a first virtual object in a partial area of the image;

based on receiving a user input to enlarge the first virtual object, increasing a size of the first virtual object, wherein the first virtual object includes a plurality of virtual elements;

based on the increased size of the first virtual object being less than a set value as a result of increasing the size of the first virtual object, maintaining a shape of the first virtual object while the size of the first virtual object is being increased;

based on the increased size of the first virtual object reaching the set value as the result of increasing the size of the first virtual object, changing the first virtual object into a second virtual object by rearranging a display location of the plurality of virtual elements to be spaced apart from each other in 3D space; and providing, using the at least one display, at least one of the plurality of virtual elements in a first area that corresponds to the image being displayed and the other virtual elements of the plurality of virtual elements, excluding the at least one of the plurality of virtual elements, in a surrounding area except the first area, wherein the surrounding area is a 360-degree virtual space surrounding a position of a user wearing the wearable electronic device.

* * * * *